US007289016B2

(12) United States Patent
Luebke et al.

(10) Patent No.: US 7,289,016 B2
(45) Date of Patent: Oct. 30, 2007

(54) PORTABLE TIMER APPARATUS, HOME SYSTEM AND METHOD OF TIMING FOR AN OBJECT

(75) Inventors: Charles J. Luebke, Sussex, WI (US); Michael L. McManus, Oakdale, PA (US); John A. Kolojejchick, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 441 days.

(21) Appl. No.: 10/853,664

(22) Filed: May 25, 2004

(65) Prior Publication Data

US 2005/0278519 A1 Dec. 15, 2005

(51) Int. Cl.

*G08B 1/00* (2006.01)
*B60Q 1/00* (2006.01)
*G04B 47/00* (2006.01)
*G04F 1/00* (2006.01)
*G04F 8/00* (2006.01)
*G04F 10/00* (2006.01)

(52) U.S. Cl. ............................ 340/309.16; 340/309.3; 340/309.7; 340/457.4; 368/10; 368/12; 368/89; 368/107; 702/176; 702/177; 702/178

(58) Field of Classification Search ........... 340/309.16, 340/309.3, 309.7, 457.4; 368/10, 12, 89–113; 702/176–178; 701/30

See application file for complete search history.

(56) References Cited

U.S. PATENT DOCUMENTS 5,581,486 A * 12/1996 Terada et al. ............... 702/177
5,583,831 A * 12/1996 Churchill et al. ............. 368/10
5,987,011 A 11/1999 Toh
6,034,961 A 3/2000 Masuo et al.
6,072,384 A * 6/2000 Baker ...................... 340/309.7
6,167,025 A 12/2000 Hsing et al.
6,583,720 B1 6/2003 Quigley
6,816,442 B1 * 11/2004 Heiman et al. ............. 368/107
6,983,188 B2 * 1/2006 Loughran et al. ............. 700/99

OTHER PUBLICATIONS

Johnson, David B., et al., "Dynamic Source Routing in Ad Hoc Wireless Networks", Mobile Computing, 1996, 18 pp.

Chipcon, "CC1010 Product Information", http://www.chipcon.com/index.cfm?kat_id=2&subkat_id=12&dok_id=55, Oct. 6, 2003, 2 pp.

(Continued)

*Primary Examiner*—Benjamin C. Lee
*Assistant Examiner*—Lam Pham
(74) *Attorney, Agent, or Firm*—Martin J. Moran

(57) ABSTRACT

A home system includes a server having a first wireless communication port, and a plurality of devices, such as sensors. Each one of the devices includes a corresponding second wireless communication port. One or more of the devices is a timer/reminder sensor device associated with an object of interest. The timer/reminder sensor device includes a timer mechanism having a time input and an output. The timer mechanism is associated with the object and is adapted to input a time interval from the time input, time for the time interval and then responsively output to the output. The timer mechanism communicates the time input and the output of the timer mechanism between the second wireless communication port of the timer/reminder sensor device and the first wireless communication port of the server.

28 Claims, 10 Drawing Sheets

OTHER PUBLICATIONS

SearchSecurity.com, "key fob," http://searchsecurity.techtarget.com/sDefinition/0,,sid14_gci795968,00.html, Sep. 22, 2003.

GE Industrial Systems, "Electronic House Magazine Names Smart ConnectionCenter and NetworX NX-8E Product of the Year", Aug. 12, 2003, 2 pp.

GE Industrial Systems, "GE Interlogix Releases The Concord Ultra Security System", Sep. 2, 2003, 2 pp.

Visions for Independent Living, "Your Visions Can Come True with The Visions System", http://www.thevisionssystem.com/index.htm, Feb. 14, 2004, 2 pp.

Visions for Independent Living, "What is Visions Basic Design?", http://www.thevisionssystem.com/visions_basic_design.htm, Feb. 14, 2004, 1 p.

Visions for Independent Living, "Visions Voice Prompting System", http://www.thevisionssystem.com/visons_vp.htm, Feb. 14, 2004, 2 pp.

Visions for Independent Living, "Visions Picture Prompting System", http://www.thevisionssystem.com/visons_pp.htm, Feb. 14, 2004, 2 pp.

Visions for Independent Living, "What is The Visions System?", http://www.thevisionssystem.com/The%20Visions%20System.htm, Feb. 14, 2004, 1 p.

Visions for Independent Living, "Equipment Specifications", http://www.thevisionssystem.com/equipment_software.htm, Feb. 14, 2004, 1 p.

Visions for Independent Living, "Visions Voice Prompting System Checklist", http://www.thevisionssystem.com/vp_checklist.htm, Feb. 14, 2004, 9 pp.

Visions for Independent Living, "Equipment Checklist", http://www.thevisionssystem.com/equipchecklist.htm, Feb. 14, 2004, 3 pp.

American Standard Companies, "ClearTap Water Filtering Bathroom Faucet", http://www.americanstandard-us.com/ProductNew.asp?prodID=1023, Sep. 29, 2003, 3 pp.

American Standard Companies, "ClearTap Water Filtering System Owner's Manual", Sep. 29, 2003, 12 pp.

* cited by examiner

PORTABLE TIMER APPARATUS, HOME SYSTEM AND METHOD OF TIMING FOR AN OBJECT

CROSS-REFERENCE TO RELATED APPLICATIONS

This application is related to commonly assigned:

U.S. patent application Ser. No. 10/686,187, filed Oct. 15, 2003, entitled "Home System Including A Portable Fob Having A Display";

U.S. patent application Ser. No. 10/686,179, filed Oct. 15, 2003, entitled "Home System Including A Portable Fob Having A Rotary Menu And A Display"; and U.S. patent application Ser. No. 10/686,016, filed Oct. 15, 2003, entitled "Home System Including A Portable Fob Mating With System Components".

BACKGROUND OF THE INVENTION

1. Field of the Invention

This invention relates generally to home systems and, more particularly, to home systems employing sensors and communications, such as, for example, a wireless local area network (WLAN) or a low rate—wireless personal area network (LR-WPAN). The invention also relates to methods of timing for objects, such as, for example, residential objects. The invention further relates to timer apparatus for residential objects.

2. Background Information

There are a wide range of household tasks, including, for example, service or maintenance, that must or should be done based upon time. For example, some tasks are seasonal, such as changing furnace filters.

It is known to provide a timer on a microwave oven that may be preset to an initial value (e.g. 40 minutes). After being started, the timer counts down until the timer is reset or until the timer reaches a zero value. If the timer reaches the zero value, then an audible alarm is sounded.

It is known to provide a standalone "retirement clock" that displays days, hours, minutes and seconds to a user's "retirement". The clock counts down from a starting value (e.g., 999 days to retirement) to show the user the remaining days, hours, minutes and seconds to retirement.

It is known to provide a touch panel on a microwave oven that lets a user set a timer to remind the user to walk their dog.

It is known to provide computer-based voice prompting and picture prompting for persons (e.g., needing reminders; having a brain injury and needing prompts; having a cognitive disability and needing step-by-step instructions).

There is room for improvement in home systems, and in methods and apparatus for timing.

SUMMARY OF THE INVENTION

These needs and others are met by the present invention, which provides a method of timing and a portable timer apparatus to couple on or proximate an object by employing a portable timer mechanism having greater than one day as a predetermined time interval. The invention also provides a home system and method including a server having a first communication port, and a plurality of devices having corresponding second communication ports. One or more of the devices is a timer apparatus device associated with an object. The timer apparatus device includes a timer mechanism inputting a time interval from a time input, timing for the time interval and then responsively enabling an output. The timer mechanism communicates at least one of the time input and the output of the timer mechanism between the second communication port of the timer apparatus and the first communication port of the server.

As one aspect of the invention, a method of timing for an object comprises: employing a portable timer mechanism including a timer having a time input, a start input and an output; adapting the portable timer mechanism to couple on or proximate the object; enabling input of a predetermined time interval from the time input of the portable timer mechanism; employing greater than one day as the predetermined time interval; and enabling input of a start signal to the start input of the portable timer mechanism and responsively enabling timing for the predetermined time interval before responsively enabling the portable timer mechanism output.

The portable timer mechanism may be coupled to or proximate the object.

The method may include employing as the output of the portable timer mechanism a visual indicator; inputting the start signal; and indicating at the visual indicator a percentage of the predetermined time interval remaining after such inputting the start signal.

The method may further include outputting a first output from the visual indicator; delaying for a first time period; outputting a different second output from the visual indicator; delaying for a second time period; employing a constant sum of the first time period and the second time period; and progressively increasing one of the first and second time periods as a function of the predetermined time interval remaining after such inputting the start signal. Preferably, a ratio of the first and second time periods is equal to the predetermined time interval remaining after such inputting the start signal.

As another aspect of the invention, a portable timer apparatus for an object comprises: a timer mechanism including a time input, a start input and an output; a portable housing holding the timer mechanism; and means for coupling the portable housing on or proximate the object, wherein the timer mechanism is adapted to input a predetermined time interval from the time input, wherein the predetermined time interval is greater than one day, and wherein the timer mechanism is further adapted to input a start signal from the start input of the timer mechanism, responsively time for the predetermined time interval and responsively enable the output of the timer mechanism.

As another aspect of the invention, a home system for a residence including an object comprises: a server including a first communication port; and a plurality of devices, each one of the devices comprising a corresponding second communication port, at least one of the devices being a timer apparatus, the timer apparatus further comprising: a timer mechanism including a time input and an output, the timer mechanism being associated with the object and being adapted to input a time interval from the time input, time for the time interval and then responsively enable the output, the timer mechanism being further adapted to communicate at least one of the time input and the output of the timer mechanism between the corresponding second communication port of the timer apparatus and the first communication port of the server.

The timer apparatus may be adapted for placement on or proximate the object, which needs periodic service, maintenance or attention. The time interval may be adapted to correspond to the periodic service, maintenance or attention.

One of the devices may be a portable fob including the corresponding second communication port thereof and an input device. The portable fob may be adapted to input the time interval from the input device and to output the inputted time interval from the corresponding second communication port of the portable fob to the first communication port of the server. The server may be adapted to input the inputted time interval from the first communication port and output the inputted time interval from the first communication port to the second communication port of the timer apparatus. The timer mechanism may be adapted to input the inputted time interval from the corresponding second communication port of the timer apparatus to the time input thereof.

As another aspect of the invention, a method of timing for an object comprises: employing a home system including a server having a first communication port; employing a plurality of devices, each one of the devices including a corresponding second communication port; employing as at least one of the devices a timer apparatus associated with the object and including the corresponding second communication port, and a timer mechanism having a time input and an output; inputting a time interval from the time input, timing for the time interval and then responsively enabling the output; and communicating at least one of the time input and the output of the timer mechanism between the second communication port of the timer apparatus and the first communication port of the server.

The method may include forming a wireless communication network with the server and the devices; joining the timer apparatus to the communication network; employing a portable fob as one of the devices; and employing the portable fob to set the time input of the timer mechanism or to display the output of the timer mechanism.

The method may further include detecting that the time interval has expired; sending an alert from the timer mechanism to the server; sending the alert from the server to the portable fob; and displaying the alert at the portable fob.

The method may further include determining a percentage of the time interval that has expired; sending the percentage from the timer mechanism to the server; sending the percentage from the server to the portable fob; and displaying the percentage at the portable fob.

The method may also include employing the timer mechanism further having a reset input; setting the time interval to zero; and detecting the reset input when the time interval is zero and responsively sending a message from the corresponding second communication port of the timer apparatus to the first communication port of the server. The method may further include including an alert with the message.

As another aspect of the invention, a method of timing for an object comprises: employing a home system including a server having a first communication port; employing an input device including an input and a second communication port; including with the server a timer mechanism associated with the object; including with the timer mechanism a time input and an output; inputting a time interval from the time input, timing for the time interval and then responsively enabling the output; and communicating the time input from the second communication port of the input device to the first communication port of the server.

The method may include inputting a reset signal at the input device; communicating the reset signal from the second communication port of the input device to the first communication port of the server; and restarting the timer mechanism for the time interval responsive to the reset signal.

As another aspect of the invention, a home system for a residence including an object comprises: a display device comprising a display and a first communication port; a server comprising a second communication port and a timer mechanism including a time input and an output, the timer mechanism being associated with the object and being adapted to input a time interval from the time input, time for the time interval and then responsively enable the output, the timer mechanism being further adapted to communicate at least one of the time input and the output of the timer mechanism between the second communication port of the server and the first communication port of the display device; and an input device associated with the object and the timer mechanism, the input device comprising a third communication port and an input, the input device being adapted to communicate the input of the input device from the third communication port of the input device to the second communication port of the server.

The input device may be adapted to input a reset signal as the input of the input device and communicate the reset signal from the third communication port of the input device to the second communication port of the server. The server may be adapted to restart the timer mechanism for the time interval responsive to the reset signal.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
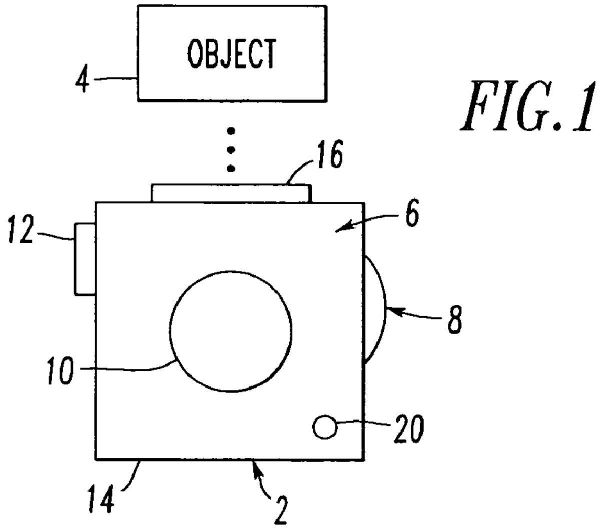
FIG. 1 is a block diagram of a standalone portable timer apparatus in accordance with the present invention.

As employed herein, the term "wireless" shall expressly include, but not be limited to, radio frequency (RF), infrared, wireless area networks, IEEE 802.11 (e.g., 802.11a; 802.11b; 802.11g), IEEE 802.15 (e.g., 802.15.1; 802.15.3, 802.15.4), other wireless communication standards, DECT, PWT, pager, PCS, Wi-Fi, Bluetooth™, and cellular.

As employed herein, the term "communication network" shall expressly include, but not be limited to, any local area network (LAN), wide area network (WAN), intranet, extranet, global communication network, the Internet, and/or wireless communication network.

As employed herein, the term "portable wireless communicating device" shall expressly include, but not be limited to, any portable communicating device having a wireless communication port (e.g., a portable wireless device; a portable personal computer (PC); a Personal Digital Assistant (PDA)).

As employed herein, the term "fob" shall expressly include, but not be limited to, a portable wireless communicating device; a wireless network device; an object that is directly or indirectly carried by a person; an object that is worn by a person; an object that is placed on or coupled to a household object (e.g., a refrigerator; a table); an object that is coupled to or carried by a personal object (e.g., a purse; a wallet; a credit card case); a portable object; and/or a handheld object.

As employed herein, the term "user input device" shall expressly include, but not be limited to, any suitable input mechanism or transducer, which collects user input through direct physical manipulation, with or without employing any moving part(s), and which converts such input, either directly or indirectly through an associated processor and/or converter, into a corresponding digital form.

As employed herein, the term "network coordinator" (NC) shall expressly include, but not be limited to, any communicating device, which operates as the coordinator for devices wanting to join a communication network and/or as a central controller in a wireless communication network.

As employed herein, the term "network device" (ND) shall expressly include, but not be limited to, any communicating device (e.g., a portable wireless communicating device; a timer/reminder sensor device; a fob; and/or a fixed wireless communicating device, such as, for example, switch sensors, motion sensors or temperature sensors as employed in a wirelessly enabled sensor network), which participates in a wireless communication network, and which is not a network coordinator.

As employed herein, the term "node" includes NDs and NCs.

As employed herein, the term "headless" means without any user input device and without any display device.

As employed herein, the term "server" shall expressly include, but not be limited to, a "headless" base station; and/or a network coordinator.

As employed herein, the term "residence" shall expressly include, but not be limited by, a home, apartment, dwelling, office and/or place where a person or persons reside(s) and/or work(s).

As employed herein, the term "home system" shall expressly include, but not be limited by, a system for a home or other type of residence.

As employed herein, a home wellness system shall expressly include, but not be limited to, a home system for monitoring and/or configuring aspects of a home or other type of residence, such as, for example, home sensors.

As employed herein, the statement that two or more parts are "connected" or "coupled" or adapted "to couple" together shall mean that the parts are joined together either directly or joined through one or more intermediate parts. Further, as employed herein, the statement that two or more parts are "attached" shall mean that the parts are joined together directly.

Referring to FIG. 1, a standalone portable timer apparatus 2 is shown. The portable timer apparatus 2 provides a method of timing for an object, such as 4. The apparatus 2 includes a suitable timer mechanism 6 having a time input 8, a start input 10 (e.g., a start timing input; a reset and start timing input; a reset or start pushbutton) and an output 12 (e.g., an audible enunciator; a chirp enunciator; a piezo speaker; a piezo buzzer). Also, the apparatus 2 may automatically start timing after power up (e.g., battery inserted; battery replaced) and, then, again in response to the start input 10. The apparatus 2 further includes a portable housing 14 holding the timer mechanism 6. The portable housing 14 includes a suitable coupling mechanism, such as a magnet 16 suitably coupled to the portable housing 14, for coupling the portable housing 14 and, thus, the timer mechanism 6, on or proximate (e.g., on another object (not shown)) the object 4.

The timer mechanism 6 is adapted to input a predetermined time interval (i.e., greater than one day) from the time input 8. The timer mechanism 6 is further adapted to input a start signal 18 (as shown in FIG. 2) from the start input 10 of the timer mechanism 6, and responsively time for the predetermined time interval before responsively enabling the output 12 thereof.

Figure 2:
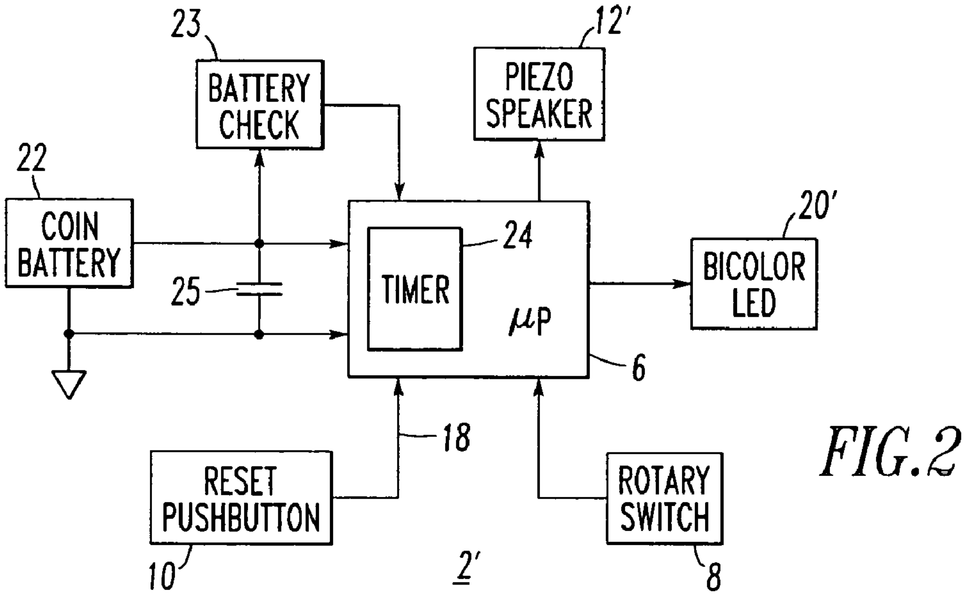
FIG. 2 is a block diagram in schematic form of another standalone portable timer apparatus in accordance with an embodiment of the invention.

As shown in FIG. 2, the timer mechanism 6 may be a microprocessor (μP) powered from a suitable battery, such as a coin battery 22, and including a hardware or software timer 24.

EXAMPLE 1

The time input 8 of FIG. 1, which selects the predetermined time interval, may be, for example, a plural-position thumbwheel or rotary switch that selects the time interval from the group comprising, for example, about 30 days (e.g., about one month), about 60 days (e.g., about two months), about 90 days (e.g., about three months), about 180 days (e.g., about six months), and about 365 days (e.g., about twelve months). Although five positions are disclosed, a wide range of counts of positions and/or corresponding time intervals may be employed. For example, a sixth position may be provided for another time interval or to disable the timer mechanism 6.

EXAMPLE 2

As shown in FIG. 1, the timer mechanism 6 may include an output, such as a visual indicator, such as an LED 20, in place of or in addition to the output 12. Here, the timer mechanism 6 is adapted to input the start signal 18 (FIG. 2) from the start input 10, responsively time for the predetermined time interval, and indicate at the LED 20 a percentage (e.g., based upon on/off duty cycle of the LED) of the predetermined time interval remaining after inputting that start signal.

For example, the timer mechanism 6 outputs a first output (e.g., a first light pulse duration) from the LED 20, delays for a first time period, outputs a different second output (e.g., a different second light pulse duration) from the LED 20, and delays for a second time period. In this example, the timer mechanism 6 employs a constant sum (e.g., several seconds; five seconds; a suitable time) of the first and second time periods, and progressively increases one of the first and second time periods as a function of the predetermined time interval remaining after inputting the start signal 18.

EXAMPLE 3

As a refinement of Example 2, a ratio of the first and second time periods is equal to the amount of the predetermined time interval remaining after inputting the start signal 18. Here, the LED 20 blinks a pattern to indicate the percentage of the time interval gone by (e.g., one long blip every about five seconds, with a short blip occurring within the five-second interval at a ratio comparable to the percentage of the time interval remaining (e.g., 20% time remaining would be the repeating sequence of a long blip, a one-second delay, a short blip, and a four-second delay; 80% time remaining would be the repeating sequence of a long blip, a four-second delay, a short blip, and a one-second delay).

For example, a long blip (or pulse) may be at least twice as long as a short blip (or pulse), in order that the user can discriminate between them. The length of a pulse is typically less than 0.5 seconds, but of sufficient duration in order that a user may detect it. The shorter the pulse, the less battery energy is consumed.

EXAMPLE 4

FIG. 2 shows another standalone portable timer apparatus 2', which is similar to the portable timer apparatus 2 of FIG. 1. The apparatus 2' includes a bicolor LED 20' (e.g., outputting a first color or a different second color; red or green).

For example, the timer mechanism 6 outputs a first output (e.g., a first color; red) from the LED 20', delays for a first time period, outputs a different second output (e.g., a second color; green) from the LED 20', and delays for a second time period. In this example, the timer mechanism 6 employs a constant sum (e.g., several seconds; five seconds; a suitable time) of the first and second time periods, and progressively increases one of the first and second time periods as a function of the predetermined time interval remaining after inputting the start signal 18.

EXAMPLE 5

As a refinement of Example 4, the bicolor LED 20' blinks a pattern to indicate the percentage of the time interval gone by (e.g., 20% time remaining would be the repeating sequence of a green pulse for a one-second period followed by a red pulse for a four-second period; 80% time remaining would be the repeating sequence of a green pulse for a four-second period followed by a red pulse for a one-second period). For example, a solid green LED shows no time expired, while a solid red LED shows that the time interval has expired.

EXAMPLE 6

Figure 3:
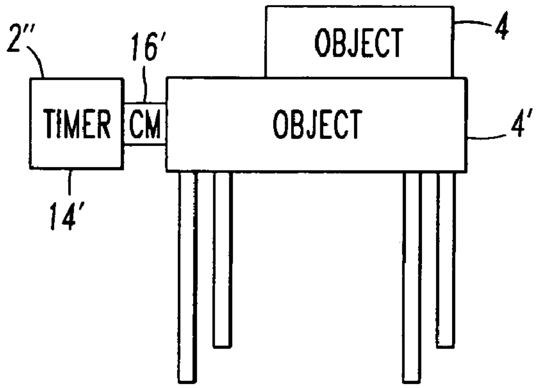
FIG. 3 is a block diagram of another standalone portable timer apparatus in accordance with another embodiment of the invention.

FIG. 3 shows another standalone portable timer apparatus 2", which is generally the same as the portable timer apparatus 2 of FIG. 1. Here, the apparatus 2" includes a portable housing 14' having a suitable coupling mechanism (CM), such as double-sided tape 16' coupled to the portable housing 14', for coupling the portable housing 14' on another object 4' (e.g., a table; a nearby object; a related object) associated with the object 4 of interest.

EXAMPLE 7

A non-limiting list of example applications for the timer apparatus 2 of FIG. 1 includes: Timer-Weekly (e.g., Take Out Garbage; Water Plants; Cut Grass); Timer-Monthly (e.g., Change Air Filter; Change Humidifier; Change Water Filter; Fertilize Lawn; Change Oil); and Timer-Annual (e.g., Birthdays; Anniversaries).

For example, the timer apparatus 2 may be coupled on or proximate the object 4 that needs periodic service, maintenance or attention. The timer apparatus 2 provides a simple reminder to the user (e.g., homeowner) regarding the associated object (e.g., a furnace or water filter needs a periodic cleaning; periodically add salt to water softener).

EXAMPLE 8

The setup sequence for the timer apparatus 2 includes: (1) set the time input 8, which selects the predetermined time interval, to the desired time interval; (2) insert the coin battery 22 (FIG. 2) or activate the start input 10; and (3) couple the timer apparatus 2 on or proximate the object 4.

EXAMPLE 9

For operation, the LED 20' of FIG. 2 may blink green to show that the timer apparatus 2' is powered and timing for the time interval. When the time interval expires, the piezo speaker output 12' may chirp and the LED 20' may blink red. After the user services the object 4 (FIG. 1), the user presses the reset pushbutton 10 to restart the time interval.

EXAMPLE 10

As a refinement to Example 9, when the coin battery 22 is determined to be near end of life (e.g., a low voltage) by battery check circuit 23, then the piezo speaker output 12' may chirp with a different sound than the chirp corresponding to the expired time interval. If the user replaces the coin battery 22, then preferably a suitable (e.g., 30 second) reserve charge is provided by a capacitor 25 that allows the coin battery 22 to be swapped without removing power from the µP-based timer mechanism 6, thereby maintaining the internal timer value.

Figure 4:
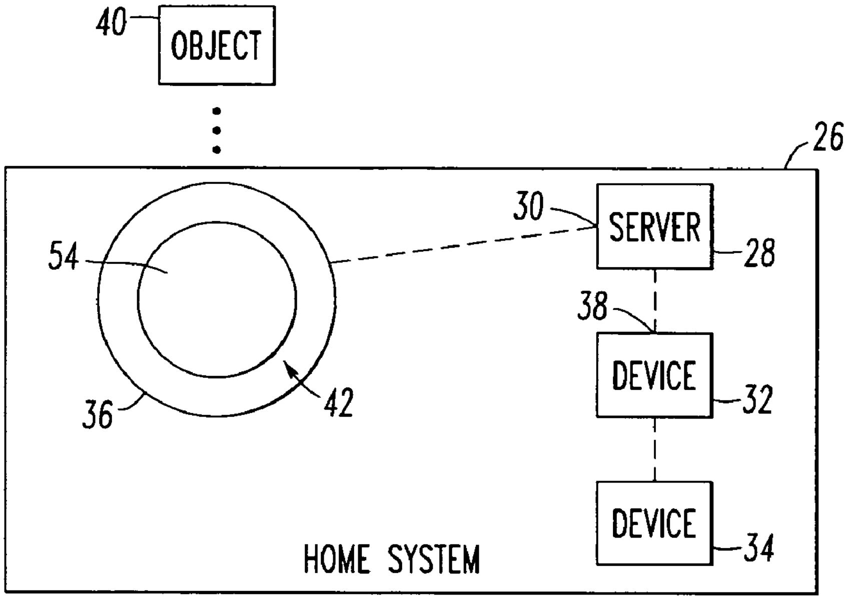
FIG. 4 is a block diagram of a home system including a server, a timer/reminder sensor and a plurality of devices in accordance with another embodiment of the invention.

Referring to FIG. 4, a home system 26 is shown. The home system 26 includes a server 28, such as a base station, having a first wireless communication port 30 and a plurality of devices 32,34,36 in communication with the server 28. Each one of the devices 32,34,36, as shown with device 32, includes a corresponding second wireless communication port (e.g., a radio transceiver) 38. One or more of the devices 32,34,36, such as device 36, is a timer/reminder sensor associated with an object 40 of interest.

Figure 5:
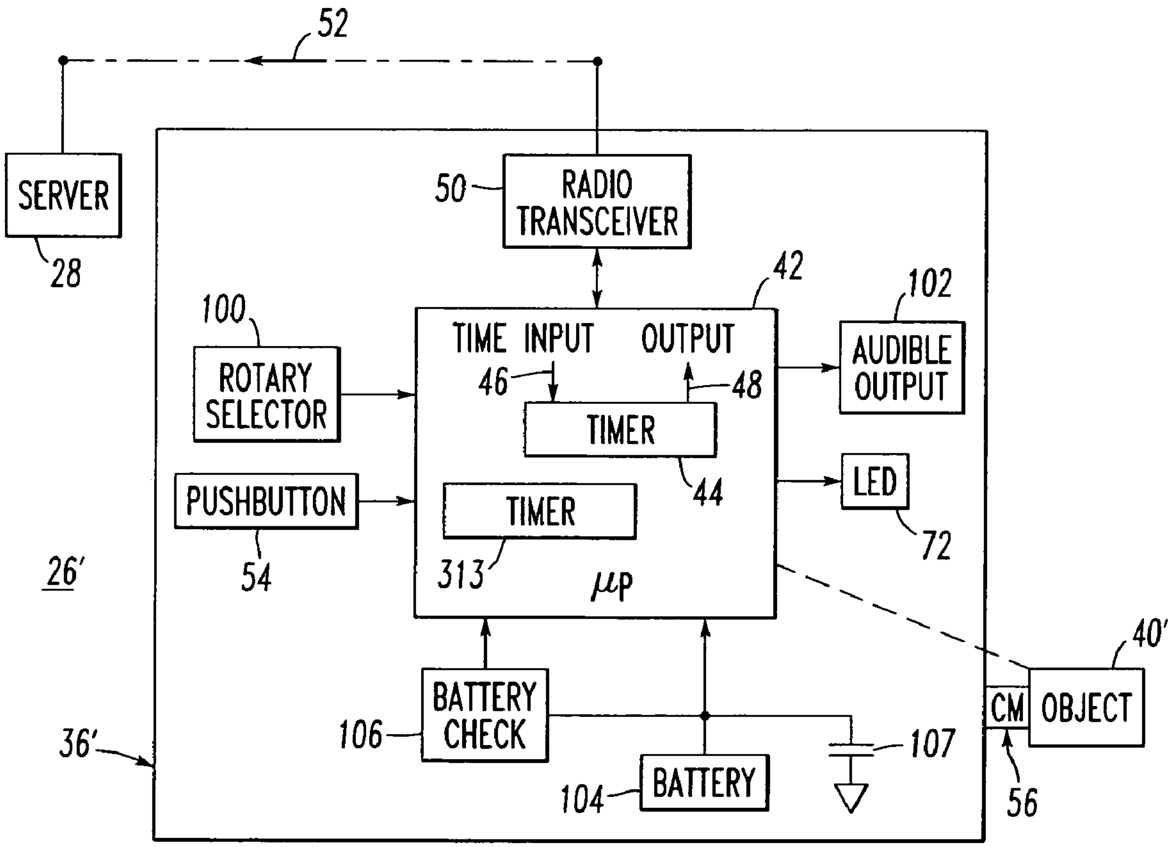
FIG. 5 is a block diagram in schematic form of another home system including a server and a timer/reminder sensor in accordance with another embodiment of the invention.

FIG. 5 shows another home system 26' including a timer/reminder sensor device 36', which may be similar to the timer/reminder sensor device 36 of FIG. 4, or which may have additional features as are disclosed, below. As shown in FIG. 5, the device 36' includes a timer mechanism (µP) 42 having a software or hardware timer 44 with a time input 46 and an output 48. The device 36' also includes a suitable wireless (e.g., RF) communication port, such as radio transceiver 50. The timer mechanism (µP) 42 is associated with an object 40' and is adapted to input a time interval from the time input 46, time for the time interval and, then, responsively output, at output 48, to the radio transceiver 50, which communicates a wireless alert 52 to the server 28.

EXAMPLE 11

As shown in FIG. 5, the timer/reminder sensor device 36' may include a start or reset input, such as a pushbutton 54, to start or reset the timer 44, in order to indicate that the object 40' was serviced.

EXAMPLE 12

A non-limiting list of example applications for the timer/reminder sensor devices 36,36' of FIGS. 4 and 5 includes: Timer-Daily (e.g., Take Medicine; Take Vitamin; Feed Pet; Walk Dog; Water Garden; Get Mail); Timer-Weekly (e.g., Take Out Garbage; Water Plants; Cut Grass); Timer-Monthly (e.g., Change Air Filter; Change Humidifier; Change Water Filter; Fertilize Lawn; Change Oil); Timer-Annual (e.g., Birthdays; Anniversaries); and Timer-Countdown (e.g., 321 Days to Christmas; 123 Days to Vacation; any suitable timer period or end date as set by a rotary switch 100 (FIG. 5) or fob 62 (FIG. 6)).

For example, the timer/reminder sensor devices 36,36' may be coupled on or proximate an object, or otherwise be suitably associated with such object, that needs periodic service, maintenance or attention. The devices 36,36' provide a simple reminder to the user (e.g., homeowner) regarding the associated object (e.g., a furnace or water filter needs a periodic cleaning; gutters need periodic cleaning; periodically add salt to water softener).

EXAMPLE 13

As shown in FIG. 5, the timer/reminder sensor device 36' preferably includes a suitable coupling mechanism (CM) 56 (e.g., a magnet; double sided tape) to couple on or proximate the object 40' of interest, which needs periodic service, maintenance or attention. Here, the time interval of the timer time input 46 corresponds to the periodic time for that service, maintenance or attention.

Figure 6:
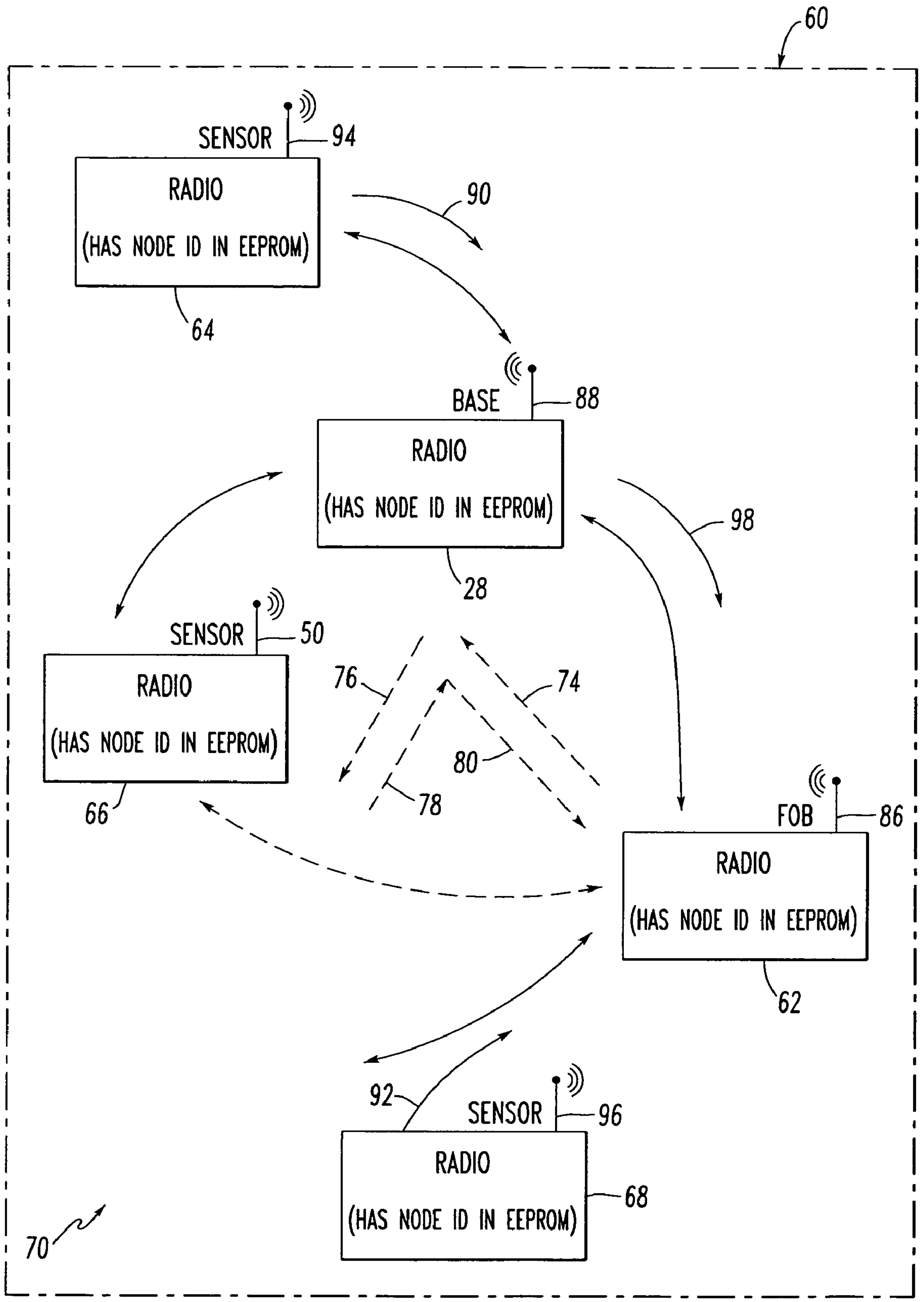
FIG. 6 is a block diagram of a home system including a base station, a timer/reminder sensor, a portable fob and a plurality of other sensors in accordance with another embodiment of the invention.

Referring to FIG. 6, a wireless home wellness system 60 is shown. The system 60 includes the server 28, such as a "headless" RF base station, a portable RF fob or "house key" 62, and a plurality of RF sensors, such as 64,66,68. The sensors 64,66,66 may include, for example, an analog sensor, an on/off digital detector, and the sensor devices 36,36' of FIGS. 4 and 5. The sensors 64,66,68, base station 28 and fob 62 all employ relatively short distance, relatively very low power, RF communications. These components 28,62, 64,66,68 form a wireless communication network 70 in which the node ID for each of such components is unique and preferably is stored in a suitable non-volatile memory, such as EEPROM, on each such component.

The base station 28 (e.g., a wireless web server; a network coordinator) may collect data from the sensors 64,66,68 and "page," or otherwise send an RF alert message to, the fob 62 in the event that a critical status changes at one or more of such sensors. Alternatively, the user may be informed by the base station 28 through other remote devices (not shown) (e.g., a cell phone; a pager; a PDA).

The fob 62 may be employed as both a portable in-home monitor for the various sensors 64,66,68 and, also, as a portable configuration tool for the base station 28 and such sensors.

The example base station 28 is headless and includes no user interface. The sensors 64,66,68 preferably include no user interface, although some sensors, such as the sensor device 36' of FIG. 5, may have a status indicator (e.g., a LED 72). The user interface functions are preferably provided by the fob 62. As shown with the sensor 68, the network 70 preferably employs an adhoc, multihop capability, in which the sensors 64,66,68 and the fob 62 do not have to be within range of the base station 28, in order to communicate.

EXAMPLE 14

As shown in FIG. 6, after the sensor 66, which functions as the sensor device 36' of FIG. 5, joins the network 70, the portable fob 62 is employed to set the time input 46 (FIG. 5) through messages 74,76, and/or to display the timer output 48 (FIG. 5) through the messages 78,80. The base station 28 receives the messages 74,78 and transmits the messages 76,80, respectively.

EXAMPLE 15

Figure 8:
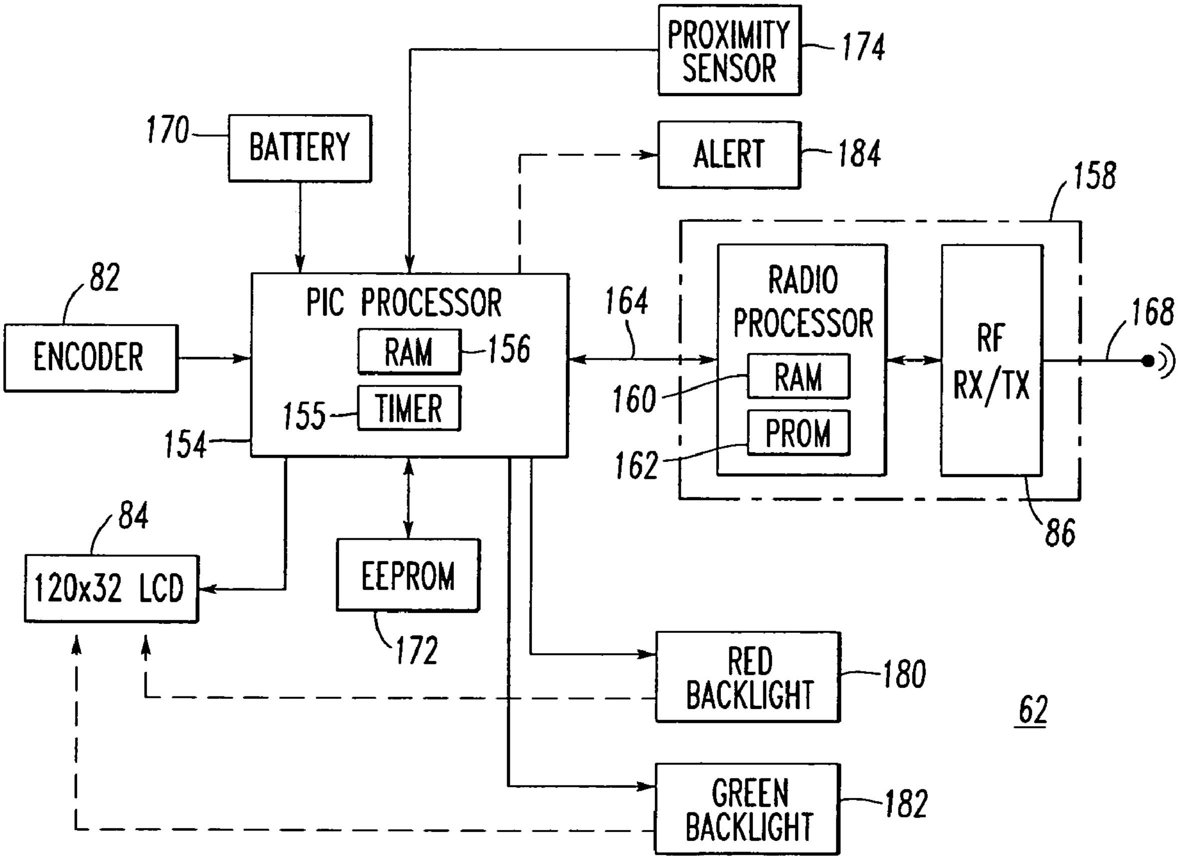
FIG. 8 is a block diagram of the portable fob of FIG. 6.

As shown in FIG. 8, the fob 62 includes a user input device 82 and a display 84. The fob 62 is adapted to input the time interval for the sensor device 36' from the user input device 82 and to output the inputted time interval in the message 74 from its communication port 86 to the communication port 88 of the base station 28. In turn, the base station 28 is adapted to input the inputted time interval in the message 74 from its communication port 88 and output the inputted time interval in the message 76 from its communication port 88 to the communication port 50 of the sensor 66. Then, the sensor 66 is adapted to input the inputted time interval in the message 76 from its communication port 50 to the time input 46 (FIG. 5).

EXAMPLE 16

The sensor 66 is adapted to output the timer output 48 (FIG. 5) in the message 78 from its communication port 50 to the communication port 88 of the base station 28. In turn, the base station 28 is adapted to input the timer output in the message 78 from its communication port 88 and output the inputted timer output in the message 80 from its communication port 88 to the communication port 86 of the fob 86. Then, the fob 86 is adapted to input the inputted timer output in the message 80 from its communication port 86 and output the same to its display 84 (FIG. 8). The timer output 48 (FIG. 5) may include, for example, the time remaining, the time elapsed, the percentage time remaining (e.g., Remaining Useful Life (RUL)), the percentage time elapsed, the timer expiration date and/or time (e.g., Sunday, Sep. 1, 2004 at 1 pm EDT), and/or an alert that the timer 44 (FIG. 5) has expired.

EXAMPLE 17

As an alternative to Example 15, the messages 74,76 may include a timer reset command from the fob 62 to the sensor 66, in order to remotely start or reset the timer 44 (FIG. 5) from the user input device 82 (FIG. 8) of the fob 62.

EXAMPLE 18

The other sensors 64,68 are adapted to sense information from their surroundings and communicate such sensed information in messages 90,92 to the base station 28 through communication ports 94,96, respectively.

EXAMPLE 19

The base station 28 is adapted to send the sensed information from the sensor messages 90,92 in one or more messages 98 from its communication port 88 to the fob communication port 86. In turn, the fob 62 is adapted to display the sensed information for one, some or all of the sensors 64,66,68 at the fob display 84 (FIG. 8).

EXAMPLE 20

In accordance with an important aspect of the invention, the sensor 66 preferably sends the message 78 to the base station 28 at least one per day, in order that the base station 28 and, thus, the fob 62 through the corresponding messages 80, is kept up to date regarding the timer output 48 (FIG. 5). Whenever the timer 44 (FIG. 5) expires, as detected by the timer mechanism 42, the message 78 is sent immediately from the sensor 66 to the base station 28 as an alert that the timer 44 (FIG. 5) has expired. The base station 28, then, responsively sends the message 80 as an alert to the fob 62, which responsively displays the alert on the fob display 84 (FIG. 8). Hence, the user is reminded by the fob 62 to service the object (such as 40' of FIG. 5) associated with the sensor 66 and to reset the time interval (e.g., remotely, at the fob 62; locally, at the sensor 66).

EXAMPLE 21

As shown by reference to FIGS. 5, 6 and 8, the time interval of the timer 44 of the timer/reminder sensor device 36' may preferably be set from the user interface 82 of the fob 62, which communicates the time interval in the message 74 to the base station 28, which, in turn, communicates the time interval in the message 76 through the radio transceiver 50 to the microprocessor 42. The microprocessor 42 responsively sets the time input 46 of the timer 44 to that time interval.

EXAMPLE 22

Alternatively, or in addition to Example 21, as shown in FIG. 5, the time input 46 of the timer/reminder sensor device 36' may be set from a rotary switch 100 (e.g., with plural detents corresponding to a plurality of different time intervals), in the manner of the plural-position thumbwheel or rotary switch time input 8 of FIG. 1.

EXAMPLE 23

As shown in FIG. 5, the timer/reminder sensor device 36' may include an audible output or enunciator 102. After the microprocessor 42 times for the time interval, it responsively outputs to the audible output 102, in order to audibly (e.g., providing a "need service" chirp) draw the user (e.g., homeowner) to the object 40' that needs service, maintenance or attention.

Preferably, the audible output 102 includes a first state (e.g., quiet) when the timer 44 is timing, and a different second state (e.g., a chirp with a first sound for an alert/alarm) when the timer 44 times out and the microprocessor 42 responsively enables the audible output 102.

The timer/reminder sensor device 36' may also include a battery 104 and a battery test circuit 106. When the battery test circuit 106 determines that the battery 104 needs replaced, it outputs to the microprocessor 42, which responsively enables the audible output 102 with a different third state (e.g., chirp with a different second sound). If the user replaces the battery 104, preferably a suitable (e.g., 30 second) reserve charge is provided by a capacitor 107 that allows the battery 104 to be swapped without removing power from the microprocessor 42, thereby maintaining the internal timer value.

EXAMPLE 24

Alternatively, or in addition to Example 23, after the microprocessor 42 of FIG. 5 times for the time interval, it responsively outputs to the radio transceiver 50, which communicates the expiration of the time interval to the server 28 through the alert message 52. The server 28, in turn, communicates the expiration of the time interval as the alert message 80 (FIG. 6) through its communication port 88 to the fob 62. The fob 62, in turn, displays an alert on its display 84 (FIG. 8), in order to draw the user (e.g., homeowner) to the object 40' that needs service, maintenance or attention.

EXAMPLE 25

Alternatively, or in addition to Examples 23 and/or 24, after the microprocessor 42 of FIG. 5 times for the time interval, it responsively outputs to a suitable visual indicator, such as bicolor LED 72, which changes from a first state (e.g., green flashing for powered and counting down) to a different second state (e.g., red flashing for need to be serviced).

EXAMPLE 26

The timer/reminder sensor devices 36,36' of FIGS. 4 and 5 may be configured remotely through the fob user input device 82 (FIG. 8) and, also, may enunciate the timeout of the timer 44 (FIG. 5) remotely through the fob display 84 (FIG. 8). Also, the timer/reminder sensor device 36' may be configured locally through the rotary switch 100, and/or may indicate and/or enunciate the timer timeout through the LED 72 and/or the audible output 102.

EXAMPLE 27

The timer/reminder sensor devices 36,36' of FIGS. 4 and 5 may be reset locally through the pushbutton 54 (e.g., a button to reset the timer 44; to indicate that the object 40' was serviced) and/or remotely through the fob user interface 82 (FIG. 8).

EXAMPLE 28

Preferably, the fob 62 provides one or more of these functions: (1) setting the time interval to the timer time input 46 through the fob user interface 82; (2) setting the current time and/or the timer expiration date and/or time (e.g., Sunday, Sep. 1, 2004 at 1 pm EDT) through the fob user interface 82; (3) starting or resetting the timer 44 through the fob user interface 82; (4) displaying the time remaining in the time interval at the fob display 84 (e.g., the time remaining; the time elapsed; the percentage of the time interval that remains; the percentage of the time interval that has elapsed); and/or (5) displaying and/or enunciating the alert associated with the expiration of the time interval at the fob display 84.

EXAMPLE 29

The setup sequence for the timer/reminder sensor devices 36,36' of FIGS. 4 and 5 include: (1) having the device 36,36' join the communication network 70 of FIG. 6; (2) using the fob 62 or the local sensor device input 100 (FIG. 5) to set the desired time interval; and (3) coupling the device 36,36' on or proximate the object of interest (e.g., object 40' of FIG. 5).

Here, the user perceives that he/she has mounted a "sensor," which is locally monitoring the associated object of interest, rather than a timer/reminder device. The advantage is that a relatively more complex, expensive and/or unreliable "sensor" is not required to detect when service, maintenance or attention (e.g., clogged gutters; needs replaced filter; needs salt in a water softener) is actually required. Instead, the timer/reminder sensor device 36,36' ensures that the service, maintenance or attention is periodically performed by providing the periodic reminder to the user.

EXAMPLE 30

For operation, the timer/reminder sensor device 36,36' sends status to the server 28 and, thus to the fob 62 (FIG. 6), about once per day for the respective home systems 26,26' of FIGS. 4 and 5. When the timer time interval expires, the timer/reminder sensor device 36,36' sends an alert to the server 28 and, thus, to the fob 62. Finally, the user services the object of interest associated with the timer/reminder sensor device 36,36' and, then, pushes the local reset pushbutton 54 or employs the fob user input device 82 to restart the timer 44.

EXAMPLE 31

As an alternative to, or in addition to, Example 23, when the battery test circuit 106 (FIG. 5) informs the microprocessor 42 that the battery 104 needs replaced, the timer/reminder sensor device 36' sends an alert to the server 28 and, thus, to the fob 62 (FIG. 6). In turn, the fob 62 responsively displays the battery alert on the fob display 84 (FIG. 8).

EXAMPLE 32

As a refinement to Example 24, the microprocessor 42 (FIG. 5) determines the percentage of the timer time interval that has expired and sends this percentage from the radio transceiver 50 to the server 28, which responsively sends the percentage to the fob 62 (FIG. 6) for display of the same at the fob display 84 (FIG. 8).

EXAMPLE 33

If the time interval of the timer time input 46 (FIG. 5) is set to zero, then, responsive to the start or reset input from the pushbutton 54, the timer/reminder sensor device 36,36' responsively sends an immediate/instantaneous alert message, such as 78 of FIG. 6, through the server 28 to the fob 62. For example, this permits the timer/reminder sensor device 36,36' to provide "instant" notification of user-defined alerts (e.g., 'Need Milk'; 'Get Takeout Food'; 'I'm Home').

EXAMPLE 34

As a refinement to Examples 28 and/or 29, during setup of the timer/reminder sensor devices 36,36' of FIGS. 4 and 5, the fob 62 preferably provides a name for and the desired time interval of such sensor devices from a list (not shown) of predetermined names and corresponding time intervals on the fob display 84 (FIG. 8). For example, if the user chooses the "water filter" name for the timer/reminder sensor device from that list, then it has, for example, a preset "once a month" timer setting, in order to make it that much easier to use. Hence, this provides a universal pre-customizable timer with pre-encoded settings based on typical name/setting matches.

Figure 7:
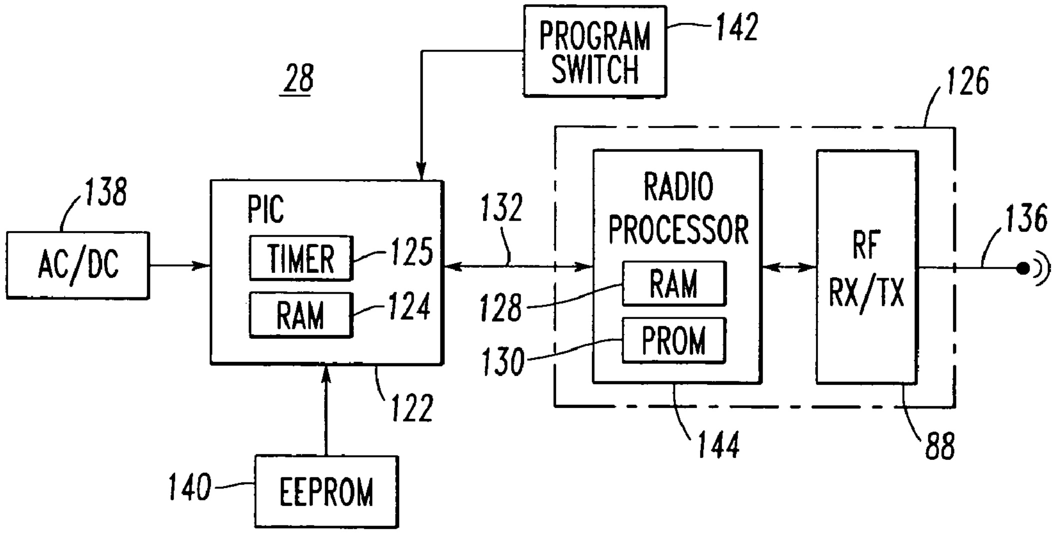
FIG. 7 is a block diagram of the base station of FIG. 6.

FIG. 7 shows the base station 28 of FIG. 6. The base station 28 includes a suitable first processor 122 (e.g., PIC® model 18F2320, marketed by Microchip Technology Inc. of Chandler, Ariz.), having RAM memory 124 and a suitable second radio or RF processor 126 having RAM 128 and PROM 130 memory. The first and second processors 122, 126 communicate through a suitable serial interface (e.g., SCI; SPI) 132. The second processor 126, in turn, employs the communication port 88, such as the RF transceiver (RX/TX), having an external antenna 136. As shown with the processor 122, the various base station components receive power from a suitable AC/DC power supply 138. The first processor 122 receives inputs from a timer 125 and a program switch 142 (e.g., which detects mating or engagement with the fob 62 of FIG. 6). The EEPROM memory 140 is employed to store the unique ID of the base station 28 as well as other nonvolatile information such as, for example, the unique IDs of other components, which are part of the wireless network 70 of FIG. 6, and other configuration related information. The second processor 126 may be, for example, a CC1010 RF Transceiver marketed by Chipcon AS of Oslo, Norway. The processor 126 incorporates a suitable microcontroller core 144, the relatively very low-power RF transceiver 88, and hardware DES encryption/decryption (not shown).

FIG. 8 shows the fob 62 of FIG. 6. The fob 62 includes a suitable first processor 154 (e.g., PIC) having RAM memory 156 and a suitable second radio or RF processor 158 having RAM 160 and PROM 162 memory. The first and second processors 154,158 communicate through a suitable serial interface (e.g., SCI; SPI) 164. The EEPROM memory 172 is employed to store the unique ID of the fob 62 as well as other nonvolatile information. For example, there may be a nonvolatile storage for icons, character/font sets and sensor labels (e.g., the base station 28 of FIG. 6 sends a message indicating that an on/off sensor is ready to configure, and the fob 62 looks up the on/off sensor and finds a predefined list of names to choose from). This expedites a relatively rapid interaction. The fob 62 may also employ a short term memory cache (not shown) that is used when the fob 62 is out of range of the base station 28. This stores the list of known sensors and their last two states. This permits the user, even if away, to review, for example, what door was open or the elapsed time of the timer 44 (FIG. 5), when the fob 62 was last in range.

The second processor 158, in turn, employs the communications port 86, such as an RF transceiver (RX/TX), having an external antenna 168. As shown with the processor 154, the various components of the fob 62 receive power from a battery 170. The first processor 154 receives inputs from a timer 155, a suitable proximity sensor, such as a sensor/base program switch 174 (e.g., which detects mating or engagement with one of the sensors 64,66,68 or with the base station 28 of FIG. 6), and a user input device, such as, for example, the exemplary encoder 82 or rotary selector/switch, such as a thumbwheel encoder. The first processor 154 also sends outputs to the fob display 84 (e.g., a 120×32

LCD), one or more visual alerts, such as a red backlight 180 (e.g., an alert is present) and a green backlight 182 (e.g., no alert is present) for the display 84, and an alert device 184 (e.g., a suitable audible, visual or vibrating device providing, for example, a sound, tone, buzzer, vibration or flashing light).

The program switch 174 may be, for example, an ESE-24 MH1T Panasonic® two-pole detector switch or a Panasonic® EVQ-11U04M one-pole micro-switch. This program switch 174 includes an external pivotable or linear actuator (not shown), which may be toggled in one of two directions (e.g., pivoted clockwise and counter-clockwise; in and out), in order to close one of one or two normally open contacts (not shown). Such a two-pole detector is advantageous in applications in which the fob 62 is swiped to engage one of the sensors 64,66,68 or base station 28 of FIG. 6. Hence, by monitoring one of those contacts, when the fob 62 is swiped in one linear direction, the corresponding contact is momentarily closed, without concern for overtravel of the corresponding engagement surface (not shown). Similarly, by monitoring the other of those contacts, when the fob 62 is swiped in the other linear direction, the corresponding contact is momentarily closed and another suitable action (e.g., a diagnostic function; a suitable action in response to removal of the fob 62; a removal of a component from the network 70; an indication to enter a different configuration or run mode) may be undertaken.

Although a physical switch 174 is disclosed, an "optical" switch (not shown) may be employed, which is activated when the fob 62, or portion thereof, "breaks" an optical beam when mating with another system component. Alternatively, any suitable device or sensor may be employed to detect that the fob 62 has engaged or is suitably proximate to another system component, such as the base station 28 or sensors 64,66,68 of FIG. 6.

The encoder 82 may be, for example, an AEC11BR series encoder marketed by CUI Inc. of Beaverton, Oreg. Although the encoder 82 is shown, any suitable user input device (e.g., a combined rotary switch and pushbutton; touch pad; joystick button) may be employed. Although the alert device 184 is shown, any suitable enunciator (e.g., an audible generator to generate one or more audible tones to alert the user of one or more corresponding status changes; a vibrational generator to alert the user by sense of feel; a visual indicator, such as, for example, an LED indicator to alert the user of a corresponding status change) may be employed. The display 84 preferably provides both streaming alerts to the user as well as optional information messages.

Figure 9A:
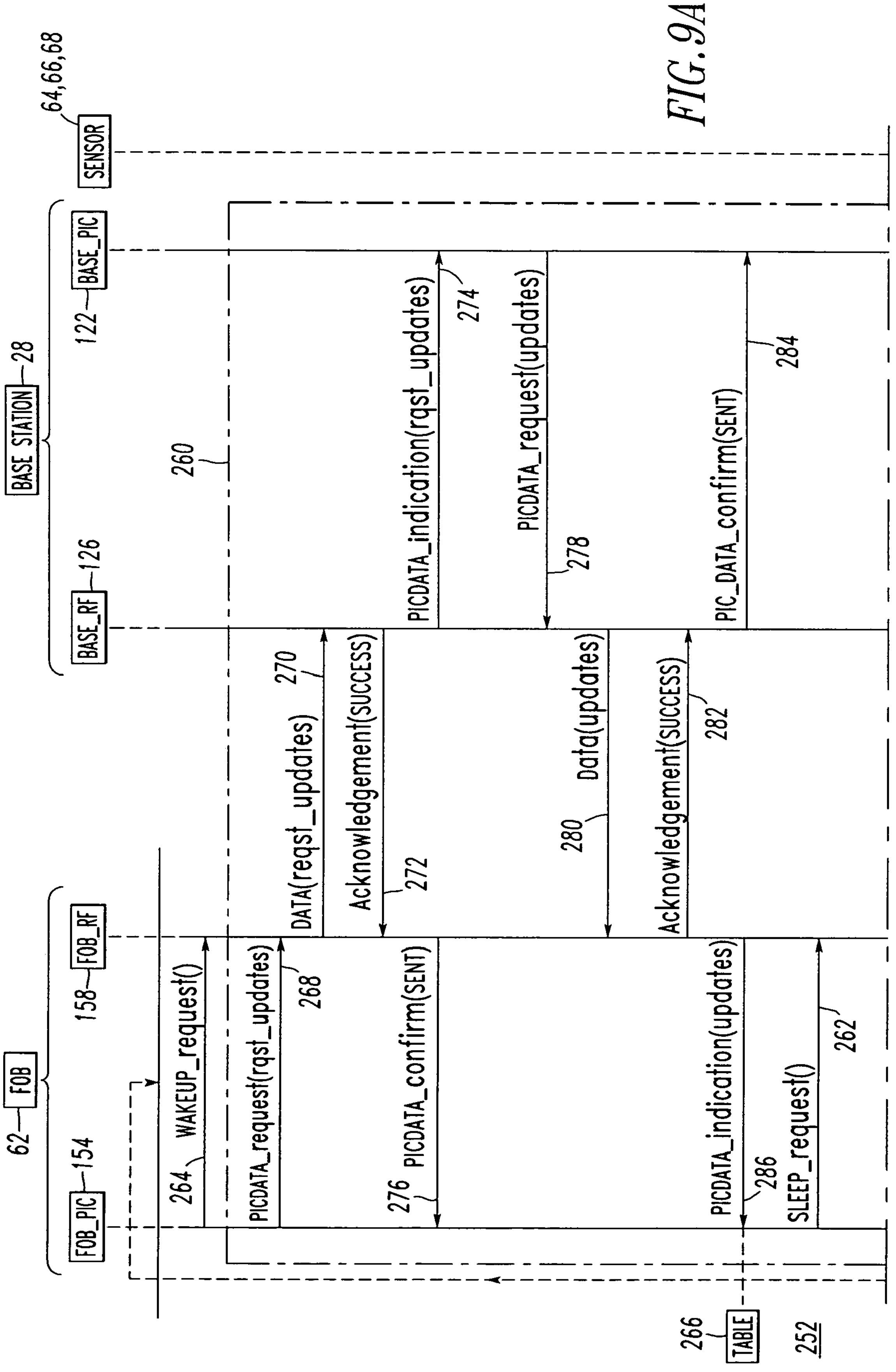
FIGS. 9A-9C are message flow diagrams showing the interaction between the portable fob, the base station and the sensors for monitoring the sensors and sending data to the base station of FIG. 6.
Figure 9B:
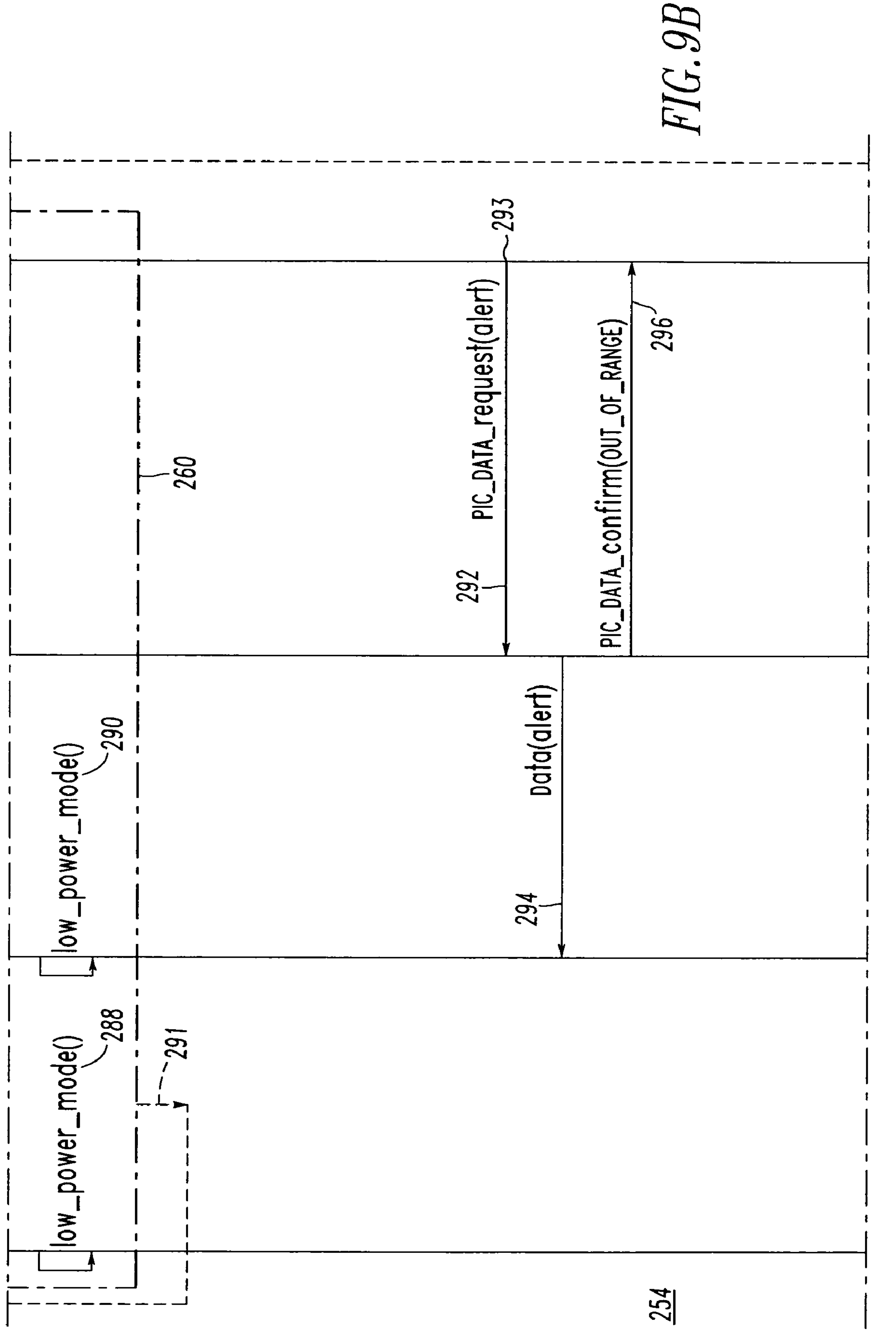
Figure 9C:
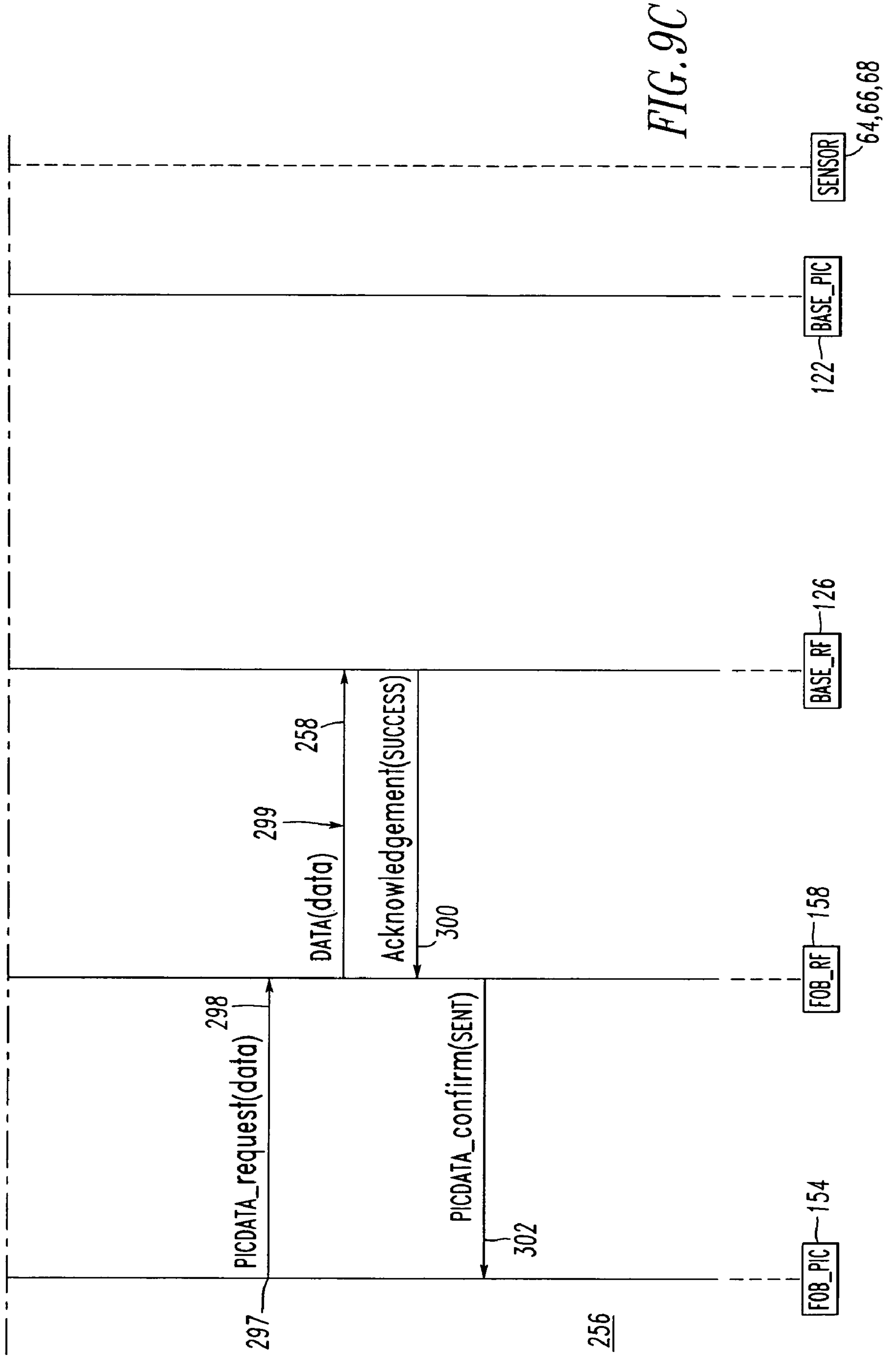

FIGS. 9A, 9B and 9C are message flow diagrams 252, 254 and 256, respectively, showing various messages between the base station 28 and the fob 62 for monitoring the sensors 64,66,68 of FIG. 6 and for sending fob data to such base station. FIG. 9A shows that the fob 62 requests and receives information from the base station 28. Preferably, those requests (only one request is shown) are initiated at regular (e.g., periodic) intervals. FIG. 9B shows that the base station 28 may also send a message to the fob 62 in response to a state change of one of the sensors 64,66,68. In this example, the fob 62 is out of range of the base station 28. FIG. 9C shows that the fob 62 sends fob data 258 to the base station 28. As shown in FIGS. 7, 8 and 9A-9C, the base station 28 includes both a PIC processor 122 and an RF processor 126, and the fob 62 includes both a PIC processor 154 and an RF processor 158. It will be appreciated, however, that such components may alternatively employ one or more suitable processors.

As shown in FIG. 9A, the fob 62 periodically requests and receives information from the base station 28. At the end of the message sequence 260, the fob PIC processor 154 sends a SLEEP_request( ) 262 to the fob RF processor 158. Then, after a suitable sleep interval to conserve battery power (e.g., one minute), the fob PIC processor 154 is woken by the fob timer 155 of FIG. 8, and the fob PIC processor 154 sends a WAKEUP_request( ) message 264 to the fob RF processor 158. In turn, the message sequence 260 is executed to refresh the local fob data table 266 with the most recent available information from base station 28 concerning the sensors 64,66,68.

As part of the sequence 260, the fob PIC processor 154 sends a PICDATA_request(rqst_updates) message 268 to the fob RF processor 158, which receives that message 268 and responsively sends a Data(reqst_updates) RF message 270 to the base RF processor 126. Upon receipt of the RF message 270, the base RF processor 126 sends an Acknowledgement(SUCCESS) RF message 272 back to the fob RF processor 158 and sends a PICDATA_indication(rqst_updates) message 274 to the base PIC processor 122. The data requested by this message 274 may include, for example, profile and state information from one or more components, such as the sensors 64,66,68. Here, the fob 62 is requesting an update from the base PIC processor 122 for data from all of the sensors 64,66,68, including any newly added sensor (not shown), in view of that state change (i.e., there is new data from the newly added sensor (not shown)). Responsive to receiving the Acknowledgement(SUCCESS) RF message 272, the fob RF processor 158 sends a PICDATA_confirm (SENT) message 276 to the fob PIC processor 154. Responsive to receiving the PICDATA_indication(rqst_updates) message 274, the base PIC processor 122 sends a PICDATA_request(updates) message 278 to the base RF processor 126, which receives that message 278 and responsively sends a Data(updates) RF message 280 to the fob RF processor 158.

After receiving the Data(updates) RF message 280, the fob RF processor 158 sends an Acknowledgement(SUCCESS) RF message 282 back to the base RF processor 126 and sends a PICDATA_indication(updates) message 286, including the requested sensor update data, to the fob PIC processor 154, which updates its local data table 266. Then, if there is no activity of the fob user input device (e.g., thumbwheel) 82, or if no alert is received from the base station 28, then the fob PIC processor 154 sends a SLEEP_request( ) message 262 to the fob RF processor 158 and both fob processors 154,158 enter a low_power_mode( ) 288,290, respectively (FIG. 9B).

After receiving the Acknowledgement(SUCCESS) RF message 282, the base RF processor 126 sends a PIC_DATA confirm(SENT) message 284 back to the base PIC processor 122. Following the message sequence 260, the fob timer 155 (FIG. 8) awakens the fob PIC processor 154, at 291 (FIG. 9B), which sends the message 264 to the fob RF processor 158, in order to periodically repeat the message sequence 260.

FIG. 9B shows an alert message sequence from the base station 28 to the fob 62, in which the fob 62 is out of range of the base station 28. First, at 293, the base station PIC processor 122 sends a PIC_DATA_request(alert) message 292 to the base station RF processor 126. In response, that processor 126 sends a Data(alert) RF message 294 to the fob RF processor 158. In this example, any RF message sent by the base station 28 while the fob 62 is out of range (or in low power mode) will be lost. After a suitable time out period, the base station RF processor 126 detects the non-response by the fob 62 and responsively sends a PIC_DATA_confirm (OUT_OF_RANGE) message 296 back to the base station PIC processor 122.

In FIG. 9C, at 297, the fob PIC processor 154 sends a PICDATA_request(data) message 298 to the fob RF processor 158. Next, the fob RF processor 158 sends a Data(data) RF message 299 including the fob data 258 to the base station RF processor 126. In response, the base station RF processor 126 sends an Acknowledgement(SUCCESS) RF message 300 to the fob RF processor 158. Finally, the fob RF processor 158 sends a PICDATA_confirm(SENT) message 302 to the fob PIC processor 154.

Figures 10A, 10B:
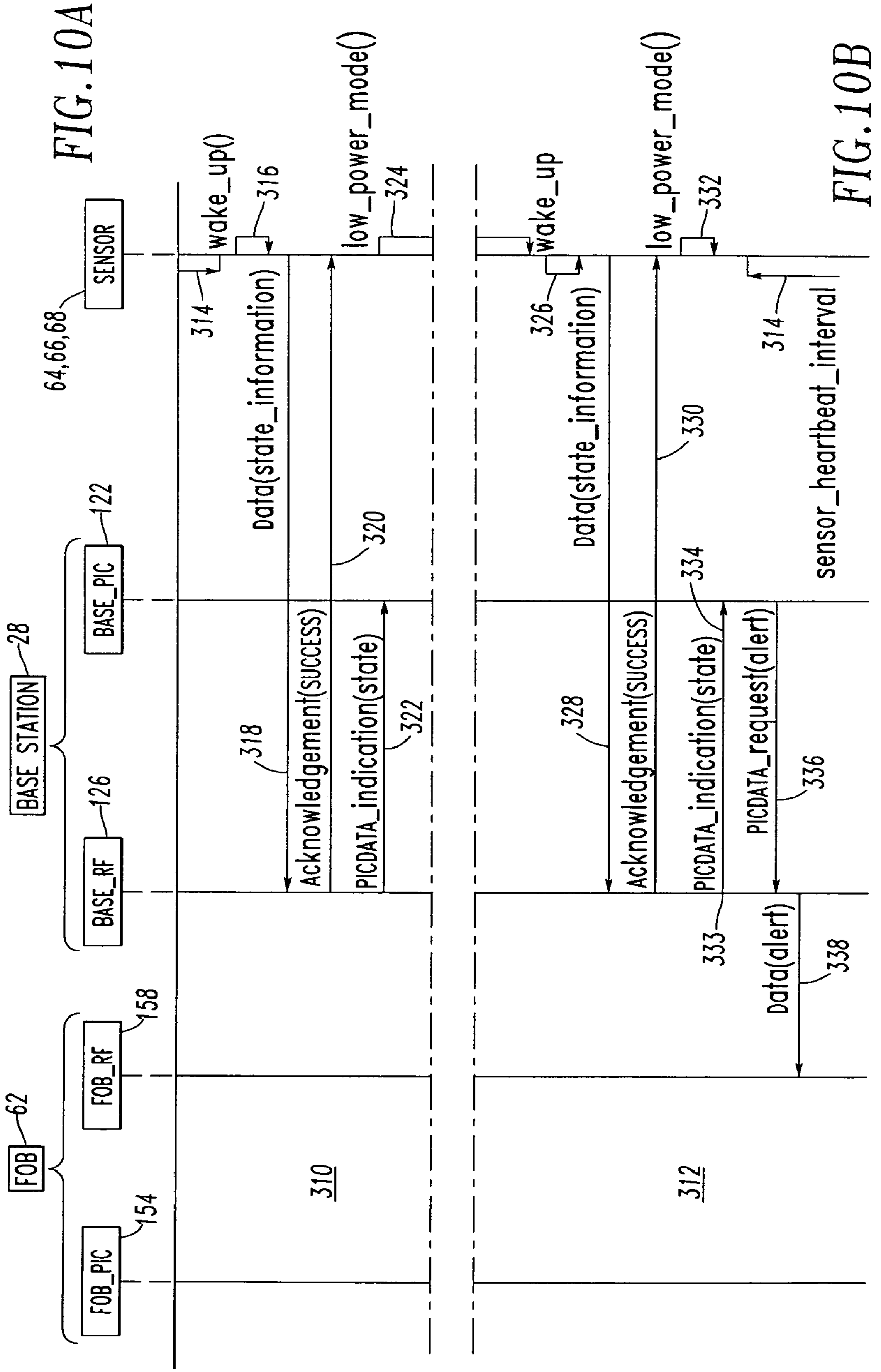
FIGS. 10A-10B are message flow diagrams showing the interaction between the timer/reminder sensor and the base station of FIG. 6 for monitoring that sensor.

FIGS. 10A and 10B are message flow diagrams 310,312 showing various messages between one of the sensors 64,66,68 and the base station 28 of FIG. 6 for monitoring that sensor. FIG. 10A shows that the sensor sends state information to the base station 28 at regular (e.g., periodic) intervals. FIG. 10B shows that the sensor also sends state information to the base station 28 in response to sensor state changes. A sensor timer 313 of FIG. 5 preferably establishes the regular interval, sensor_heartbeat_interval 314 of FIGS. 10A-10B (e.g., without limitation, once per minute; once per hour; once per day; any suitable time period), for that particular sensor, such as 64,66,68. It will be appreciated that the regular intervals for the various sensors 64,66,68 may be the same or may be different depending upon the desired update interval for each particular sensor.

In FIG. 10A, after the expiration of the sensor_heartbeat_interval 314, the sensor, such as 66, wakes up (wake_up( )) at 316. Next, the sensor 66 sends a Data (state_information) RF message 318 to the base station RF processor 126, and that RF processor 126 responsively sends an Acknowledgement(SUCCESS) RF message 320 back to the sensor 66. Responsive to receiving that message 320, the sensor 66 enters a low_power_mode( ) 324 (e.g., in order to conserve power of the sensor battery 104 of FIG. 5; for example, the timer 44 of FIG. 5 is powered and remains running, the μP 42 and radio transceiver 50 of FIG. 5 enter a sleep/idle low power mode, and the timer 44 sends an interrupt to the μP 42 to wake up when the timer 44 has expired). Also, responsive to sending that message 320, the base station RF processor 126 sends a PICDATA_indication (state) message 322 to the base station PIC processor 122. Both of the Data(state_information) RF message 318 and the PICDATA_indication(state) message 322 convey the state of the sensor 66 (e.g., timer 44 counting/expired; sensor battery OK/low). This state information is stored in the base station 28 for access by the fob 62 on request (e.g., as shown in FIG. 9A).

The low_power_mode( ) 324 is maintained until one of two events occurs. As was previously discussed, after the expiration of the sensor_heartbeat_interval 314, the sensor 66 wakes up at 316. Alternatively, as shown in FIG. 10B, the sensor 66 wakes up (wake_up( ) 326) in response to a state change (e.g., the timer 44 of FIG. 5 times out and causes an internal interrupt to wake-up the μP 42). Next, the sensor 66 sends a Data(state_information) RF message 328 to the base station RF processor 126, and that RF processor 126 responsively sends an Acknowledgement(SUCCESS) RF message 330 back to the sensor 66. Responsive to receiving that message 330, the sensor 66 enters a low_Power_mode( )

332. After the expiration of the sensor_heartbeat_interval 314, the sensor 66 wakes up at 316 of FIG. 10A. Next, at 333, the base station RF processor 126 responsively sends a PICDATA_indication(state) message 334 to the base station PIC processor 122. Both of the Data (state_information) RF message 328 and the PICDATA_indication(state) message 334 convey the state of the sensor 66. Responsive to receiving that message 334, the base station PIC processor 122 sends a PICDATA_request(alert) message 336 to the base station RF processor 126. Such an alert is sent whenever there is any sensor state change. Finally, the base station RF processor 126 sends a Data(alert) RF message 338 to the fob RF processor 158.

Figure 11:
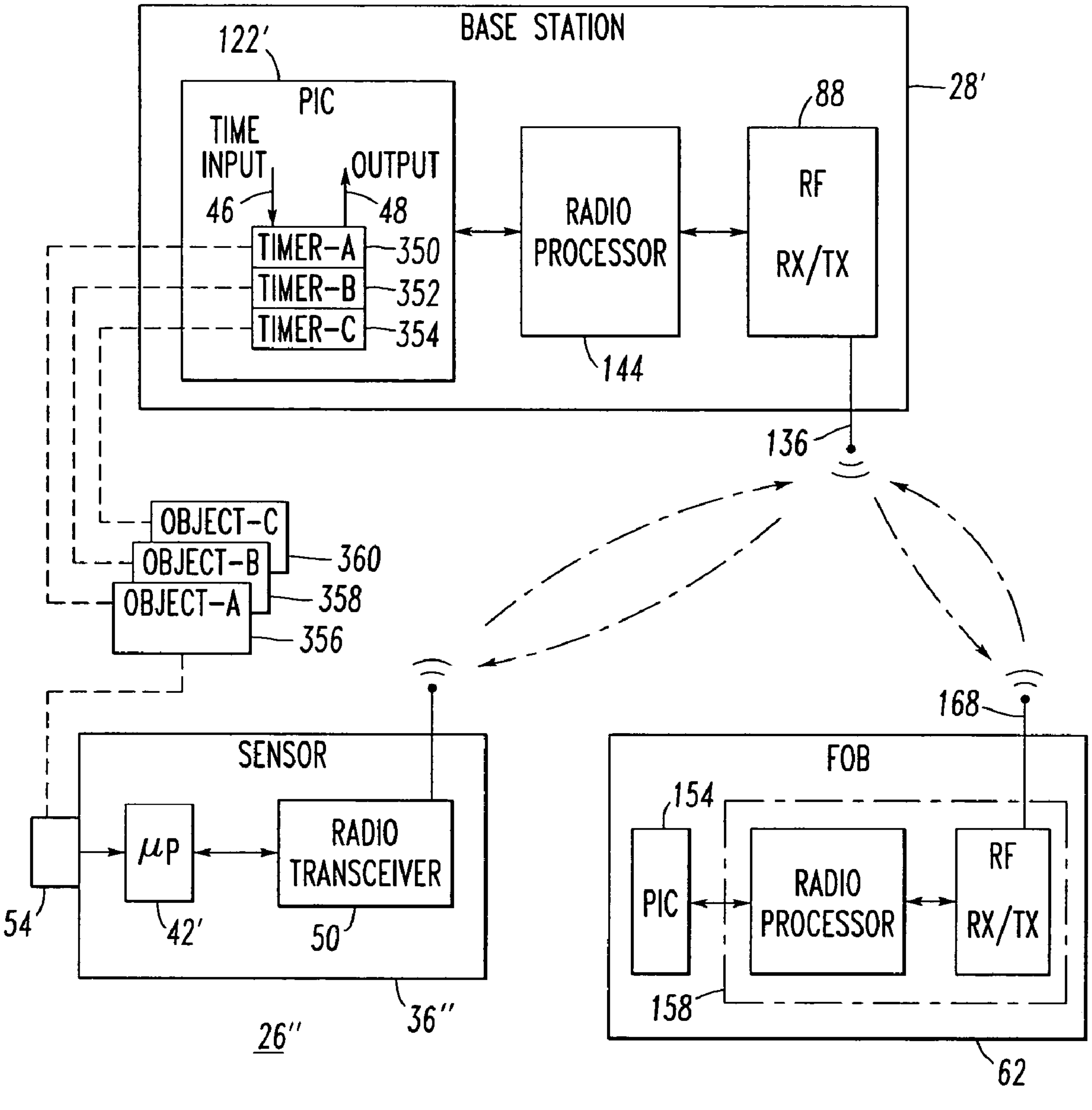
FIG. 11 is a block diagram in schematic form of another home system including a server, a sensor and a portable fob in accordance with another embodiment of the invention.

FIG. 11 shows another home system 26" including a server, such as base station 28', a sensor 36" and the portable fob 62 (FIG. 8). The base station 28' is similar to the base station 28 of FIG. 7 except that the processor 122', unlike the processor 122, includes one or more timer mechanisms, such as timer-A 350, timer-B 352 and timer-C 354 associated with respective object-A 356, object-B 358 and object-C 360. The timer mechanisms 350,352,354 may be implemented in hardware and/or software or may be similar to the timer mechanism 42 of FIG. 5, except that they are located in the base station 28' rather than in the timer/reminder sensor device 36' of FIG. 5. The sensor 36" may be a simplified version of the sensor 36' of FIG. 5, which includes the reset pushbutton 54, a microprocessor (μP) 42' and the radio transceiver 50.

The timer mechanisms 350,352,354, as shown with timer-A 350, include the time input 46 and the output 48. As was discussed above, the timer-A 350 is associated with the object 356 (object-A) and is adapted to input a time interval from the time input 46, time for that time interval and then responsively enable the output 48. The timer-A 350 is adapted to communicate one or both of the time input 46 and the output 48 thereof between the base station communication port 136 and the communication port 168 of the portable fob 62. The sensor 36" is also associated with the object 356 (object-A) and the timer-A 350 and is adapted to communicate the state of the reset pushbutton 54 from the radio transceiver communication port 50 to the communication port 136 of the base station 28'.

The portable fob 62 may be advantageously employed to communicate the time interval from the fob communication port 168 to the base station communication port 136. In turn, the base station 28' communicates the time interval to the time input 46 of the timer-A 350.

The base station 28' may communicate the timer mechanism output 48 from the base station communication port 136 to the portable fob communication port 168. In turn, the portable fob 62 displays the timer mechanism output 46 on the display 84 (FIG. 8). The user interface (not shown) of the fob display 84 sets the time interval and/or informs the user that the timer 350 (timer-A) has expired.

In accordance with a preferred practice, the sensor 36" inputs a reset signal (e.g., start or restart) from the reset pushbutton 54 and communicates the reset signal from the sensor communication port 50 to the base station communication port 136. In turn, the base station 28' restarts the timer 350 (timer-A) for the predetermined time interval responsive to the reset signal. Although not shown, the sensor 36" may include a visual and/or audible output, although those functions are preferably performed at the fob 62.

Although three timers 350,352,354 and three corresponding associated objects 356,358,360, respectively, are shown, one or more pairs of such timers and objects may be employed with one or more sensors, such as 36". Additional sensors (not shown) may be associated with the other objects 358,360 and the other timers 352,354.

Figure 12A:
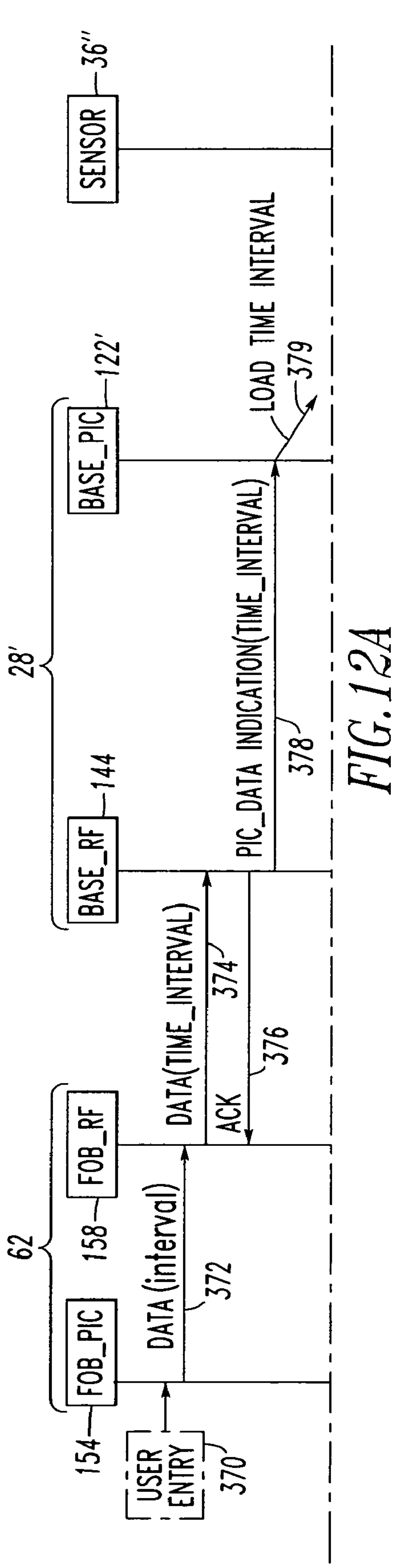
FIGS. 12A-12C are message flow diagrams showing the interaction between the server, the sensor and the portable fob for timing functions associated with the corresponding object of FIG. 11.
Figure 12B:
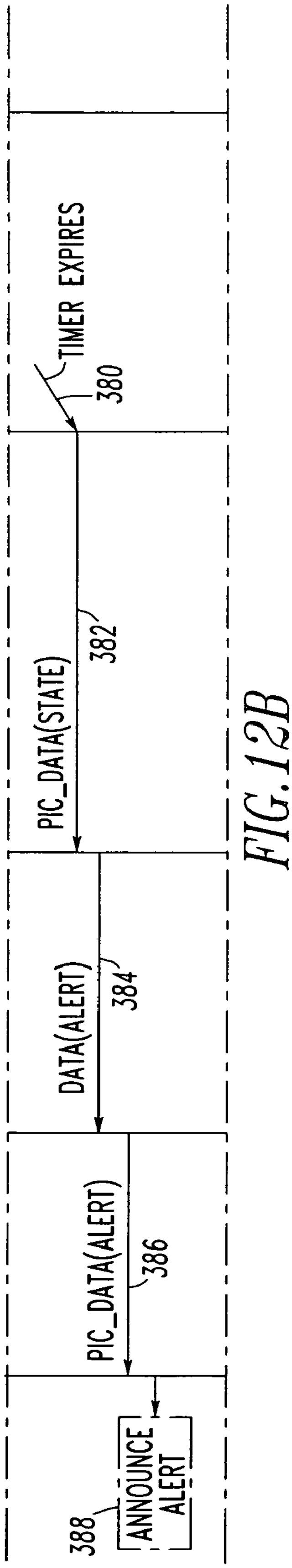
Figure 12C:
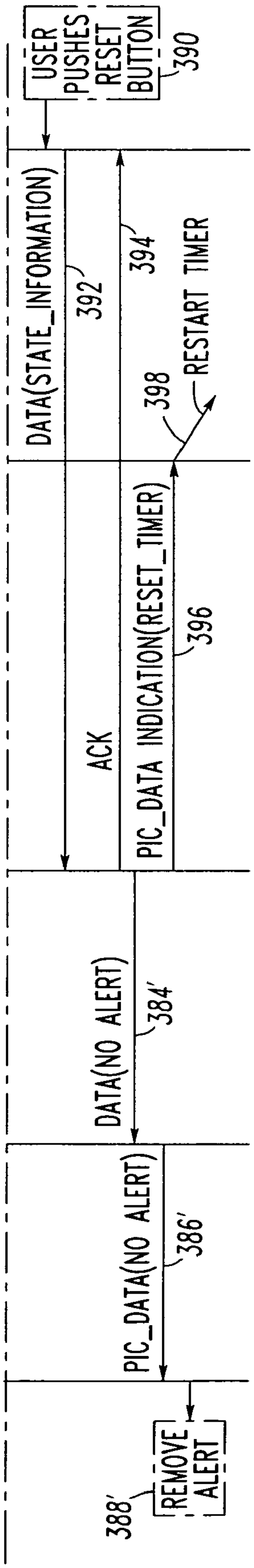

FIGS. 12A-12C show the interaction between the base station 28', the sensor 36" and the portable fob 62. In FIG.

12A, the fob 62 sets the time interval for the timer 350 (FIG. 11) in the base station 28'. Following user entry, at 370, of the time interval, the fob processor 154 sends a DATA (interval) message 372 to the fob RF processor 158. In response, that processor sends a DATA(TIME_INTERVAL) RF message 374 to the base RF processor 144. Next, the base RF processor 144 sends an acknowledge (ACK) RF message 376 back to the fob RF processor 158. Finally, the base RF processor 144 sends a PIC_DATA INDICATION (TIME_INTERVAL) message 378 to the base PIC processor 122', which responsively sets the time interval of the timer 350 (FIG. 11), at 379.

EXAMPLE 35

The timer 350 (FIG. 11) may start timing in response to the message 378 of FIG. 12A.

EXAMPLE 36

The timer 350 (FIG. 11) may start timing in response to the message 378 of FIG. 12A and the message 396 of FIG. 12C.

FIG. 12B shows the expiration of the timer 350 (FIG. 11) in the base station 28' and the resulting RF message 384 to the fob 62. First, at 380, the timer 350 (FIG. 11) expires after having been started as was discussed above in connection with Examples 35 and 36. Next, the base PIC processor 122' responsively sends a PIC_DATA(STATE) message 382 to the base RF processor 144. In turn, the base RF processor 144 sends a DATA(ALERT) RF message 384 to the fob RF processor 158. Then, the fob RF processor 158 sends a PIC_DATA(ALERT) message 386 to the fob PIC processor 154. Finally, at 388, the fob PIC processor 154 announces the timer expiration alert on one or both of the fob display 84 (FIG. 8) and/or the alert 184 (FIG. 8).

FIG. 12C shows the reset of the timer 350 (FIG. 11) in the base station 28' in response to the user pressing the reset pushbutton 54 of the sensor 36" (FIG. 11). First, at 390, the sensor processor 42' (FIG. 11) detects the activation of the pushbutton 54. In response, the sensor radio transceiver 50 sends a DATA(STATE_INFORMATION) RF message 392 to the base RF processor 144. In response, that processor 144 sends an acknowledge (ACK) RF message 394 back to the sensor radio transceiver 50. Similar to the messages 384,386 and step 388 of FIG. 12B, the respective messages 384',386' and step 388' of FIG. 12C remove the alert from the fob 62. In addition to the RF message 384', the base RF processor 144 also sends a PIC_DATA INDICATION(RESET_TIMER) message 396 to the base PIC processor 122'. Finally, at 398, that processor employs the time input 46 of the timer 350 (FIG. 11) to restart that timer.

The disclosed portable timer apparatus 2,2', 2" and timer/reminder sensor devices 36,36' being located at or proximate an object beneficially "compel" the user (e.g., homeowner) to go to the associated object, reset the timer and, hopefully, perform the corresponding service, maintenance or attention.

With the home systems 26,26', the fob alert 184 allows the user to be alerted no matter where they are relative to the object associated with the timer/reminder sensor devices 36,36'. Hence, the home systems 26,26' allow for remote alerts (e.g., remote notification).

The output of the timer mechanism 6 preferably includes a visual indicator, such as LED 20, that provides an "at a glance" ability to know the Remaining Useful Life (RUL) of the timer 24 as a percentage and/or if the timer 24 has expired and/or if the battery 22 is low. Also, the disclosed timers 24,44 for the home systems 26,26' may incorporate this feature and/or such feature may be provided by the fob display 84.

Preferably, a suitable time base (e.g., a suitable crystal oscillator) is employed for the disclosed timers 24,44, in order that there is less than, for example, about one hour time deviation per year. Hence, if the user sets a one-year timer at noon, it will not go off at midnight a year later. Alternatively, as is discussed above in connection with Examples 20 and 24, for the home systems 26,26', the user alert is routed through the base station 28. Here, the base station 28 may elect to time defer the alert until a suitable predetermined or selectable time of day when the user is likely to be available or awake.

Although microprocessor-based timer mechanisms are disclosed, it will be appreciated that a combination of one or more of analog, digital, mechanical, electromechanical and/or processor-based circuits may be employed.

The communications between the timer/reminder sensor devices 36,36' and the server 28 may be wireless (e.g., RF) as shown, point-to-point hard wired, or through another suitable hard wired communication network.

While for clarity of disclosure reference has been made herein to the exemplary fob display 84 and LEDs 20,20',72 for displaying home wellness system information and values, it will be appreciated that such information, such values, other information and/or other values may be stored, transmitted (e.g., without limitation, to a cellular telephone; via an e-mail message; to a remote client device; to a remote web browser), printed on hard copy, be computer modified, or be combined with other data. All such processing shall be deemed to fall within the terms "display" or "displaying" as employed herein.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A system for a structure including an object, said system for a structure comprising:
- a server including a first communication port; and
- a plurality of devices, each one of said devices comprising a corresponding second communication port, at least one of said devices being a timer apparatus, said timer apparatus further comprising:
- a timer mechanism including a time input and an output, said timer mechanism being associated with said object and being adapted to input independent of said server a time interval from said time input, time for said time interval and then responsively enable said output, said timer mechanism being further adapted to communicate at least one of said time input and said output of said timer mechanism between the corresponding second communication port of said timer apparatus and the first communication port of said server.

2. The system for a structure of claim 1 wherein the output of said timer mechanism is a first output; and wherein said timer mechanism further includes a second output, which enunciates when said timer mechanism times for said time interval.

3. The system for a structure of claim 2 wherein said second output is selected from the group comprising a visual indicator and an audible enunciator.

4. The system for a structure of claim 1 wherein said timer apparatus is adapted for placement on or proximate said object, which needs periodic service, maintenance or attention; and wherein said time interval is adapted to correspond to said periodic service, maintenance or attention.

5. A system for a structure including an object, said system for a structure comprising:

a server including a first communication port; and a plurality of devices, each one of said devices comprising a corresponding second communication port, at least one of said devices being a timer apparatus, said timer apparatus further comprising:

a timer mechanism including a time input and an output, said timer mechanism being associated with said object and being adapted to input a time interval from said time input, time for said time interval and then responsively enable said output, said timer mechanism being further adapted to communicate at least one of said time input and said output of said timer mechanism between the corresponding second communication port of said timer apparatus and the first communication port of said server, wherein one of said devices is a portable fob including the corresponding second communication port thereof and an input device; wherein said portable fob is adapted to input said time interval from said input device and to output said inputted time interval from said corresponding second communication port of said portable fob to the first communication port of said server; wherein said server is adapted to input said inputted time interval from said first communication port and output said inputted time interval from said first communication port to the second communication port of said timer apparatus; and wherein said timer mechanism is adapted to input said inputted time interval from said corresponding second communication port of said timer apparatus to said time input.

6. A system for a structure including an object, said system for a structure comprising:

a server including a first communication port; and a plurality of devices, each one of said devices comprising a corresponding second communication port, at least one of said devices being a timer apparatus, said timer apparatus further comprising:

a timer mechanism including a time input and an output, said timer mechanism being associated with said object and being adapted to input a time interval from said time input, time for said time interval and then responsively enable said output, said timer mechanism being further adapted to communicate at least one of said time input and said output of said timer mechanism between the corresponding second communication port of said timer apparatus and the first communication port of said server, wherein one of said devices is a portable fob including said corresponding second communication port of said portable fob and a display; wherein said timer apparatus is adapted to output the output of said timer mechanism to the second communication port of said timer apparatus; wherein said server is adapted to input the output of said timer mechanism on said first communication port and output said inputted output from said first communication port to the second communication port of said portable fob; and wherein said portable fob is adapted to input said inputted output from said corresponding second communication port of said portable fob and output said inputted output from said corresponding second communication port of said portable fob to said display.

7. A system for a structure including an object, said system for a structure comprising:

a server including a first communication port; and a plurality of devices, each one of said devices comprising a corresponding second communication port, at least one of said devices being a timer apparatus, said timer apparatus further comprising:

a timer mechanism including a time input and an output, said timer mechanism being associated with said object and being adapted to input a time interval from said time input, time for said time interval and then responsively enable said output, said timer mechanism being further adapted to communicate at least one of said time input and said output of said timer mechanism between the corresponding second communication port of said timer apparatus and the first communication port of said server, wherein one of said devices is a portable fob including the corresponding second communication port thereof and an input device; wherein the timer mechanism of said timer apparatus further includes a reset input; wherein said portable fob is adapted to input a reset command from said input device and to output said reset command from said corresponding second communication port of said portable fob to the first communication port of said server; wherein said server is adapted to input said reset command from said first communication port and output said reset command from said first communication port to the second communication port of said timer apparatus; and wherein said timer mechanism is adapted to input said reset command from said corresponding second communication port of said timer apparatus to said reset input.

8. The system for a structure of claim 1 wherein said first and second communication ports are wireless communication ports.

9. The system for a structure of claim 8 wherein some of said devices include a plurality of sensors, each one of said sensors sensing information and including said corresponding second communication port of said one of said sensors, which sends said sensed information to the first communication port of said server.

10. A system for a structure including an object, said system for a structure comprising:

a server including a first communication port; and a plurality of devices, each one of said devices comprising a corresponding second communication port, at least one of said devices being a timer apparatus, said timer apparatus further comprising:

a timer mechanism including a time input and an output, said timer mechanism being associated with said object and being adapted to input a time interval from said time input, time for said time interval and then responsively enable said output, said timer mechanism being further adapted to communicate at least one of said time input and said output of said timer mechanism between the corresponding second communication port of said timer apparatus and the first communication port of said server, wherein said first and second communication ports are wireless communication ports, wherein some of said devices include a plurality of sensors, each one of said sensors sensing information and including said corresponding second communication port of said one of said sensors, which sends said sensed information to the first communication port of said server, and wherein one of said devices is a portable fob including said corresponding second communication port of said portable fob and a display; and wherein said server is adapted to send said sensed information for at least one of said sensors from the first communication port of said server to the second communication port of said portable fob, said portable fob being adapted to display said sensed information for at least one of said sensors at the display of said portable fob.

11. A method of timing for an object, said method comprising:

employing a system for a structure including a server having a first communication port;

employing a plurality of devices, each one of said devices including a corresponding second communication port;

employing as at least one of said devices a timer apparatus associated with said object and including said corresponding second communication port, and a timer mechanism having a time input and an output;

inputting independent from said server a time interval from said time input, timing for said timeinterval and then responsively enabling said output; and communicating at least one of said time input and said output of said timer mechanism between said second communication port of said timer apparatus and said first communication port of said server.

12. The method of claim 11 further comprising employing a first wireless communication port as said first communication port; and employing a corresponding second wireless communication port as said corresponding second communication port of each of said devices.

13. The method of claim 11 further comprising outputting to a visual indicator from the output of said timer mechanism.

14. A method of timing for an object said method comprising:

employing a system for a structure including a server having a first communication port;

employing a plurality of devices, each one of said devices including a corresponding second communication port;

employing as at least one of said devices a timer apparatus associated with said object and including said corresponding second communication port, and a timer mechanism having a time input and an output;

inputting a time interval from said time input, timing for said time interval and then responsively enabling said output;

communicating at least one of said time input and said output of said timer mechanism between said second communication port of said timer apparatus and said first communication port of said server;

forming a wireless communication network with said server and said devices;

joining said timer apparatus to said wireless communication network;

employing a portable fob as one of said devices; and employing said portable fob to set the time input of said timer mechanism or to display the output of said timer mechanism.

15. The method of claim 14 further comprising detecting that said time interval has expired;

sending an alert from said timer mechanism to said server;

sending said alert from said server to said portable fob; and displaying said alert at said portable fob.

16. The method of claim 14 further comprising employing a battery including a voltage to power said timer mechanism;

determining that the voltage of said battery is below a threshold value;

sending an alert from said timer mechanism to said server;

sending said alert from said server to said portable fob; and displaying said alert at said portable fob.

17. The method of claim 14 further comprising determining a percentage of said time interval that has expired;

sending said percentage from said timer mechanism to said server;

sending said percentage from said server to said portable fob; and displaying said percentage at said portable fob.

18. A method of timing for an object, said method comprising:

employing a system for a structure including a server having a first communication port;

employing a plurality of devices, each one of said devices including a corresponding second communication port;

employing as at least one of said devices a timer apparatus associated with said object and including said corresponding second communication port, and a timer mechanism having a time input and an output;

inputting a time interval from said time input, timing for said time interval and then responsively enabling said output;

communicating at least one of said time input and said output of said timer mechanism between said second communication port of said timer apparatus and said first communication port of said server;

employing said timer mechanism further having a reset input;

setting said time interval to zero; and detecting said reset input when said time interval is zero and responsively sending a message from the corresponding second communication port of said timer apparatus to the first communication port of said server.

19. The method of claim 18 further comprising including an alert with said message.

20. A method of timing for an object, said method comprising:

employing a system for a structure including a server having a first communication port;

employing an input device including an input and a second communication port;

including with said server a timer mechanism associated with said object;

including with said timer mechanism a time input and an output;

inputting a time interval from said time input, timing for said time interval and then responsively enabling said output; and communicating said time input from the second communication port of said input device to the first communication port of said server.

21. The method of claim 20 further comprising employing as said input device a portable fob; and communicating said time interval from the second communication port of said portable fob input device to the first communication port of said server.

22. The method of claim 21 further comprising employing a display device at said portable fob;

communicating the output of said timer mechanism from the first communication port of said server to the second communication port of said portable fob; and displaying the output of said timer mechanism at the display device at said portable fob.

23. The method of claim 20 further comprising inputting a reset signal at said input device;

communicating said reset signal from the second communication port of said input device to the first communication port of said server; and restarting said timer mechanism for said time interval responsive to said reset signal.

24. A system for a structure including an object, said system for a structure comprising:

a display device comprising a display and a first communication port;

a server comprising a second communication port and a timer mechanism including a time input and an output, said timer mechanism being associated with said object and being adapted to input a time interval from said time input, time for said time interval and then responsively enable said output, said timer mechanism being further adapted to communicate at least one of the time input and the output of said timer mechanism between the second communication port of said server and the first communication port of said display device; and an input device associated with said object and said timer mechanism, said input device comprising a third communication port and an input, said input device being adapted to communicate the input of said input device from the third communication port of said input device to the second communication port of said server.

25. The system for a structure of claim 24 wherein said display device is a portable fob, which communicates said time interval from the first communication port of said portable fob to the second communication port of said server; and wherein said server communicates said time interval to the time input of said timer mechanism.

26. The system for a structure of claim 24 wherein said server communicates the output of said timer mechanism from the second communication port of said server to the first communication port of said portable fob; and wherein said portable fob displays the output of said timer mechanism on said display.

27. The system for a structure of claim 24 wherein said input device is adapted to input a reset signal as the input of said input device and communicate said reset signal from the third communication port of said input device to the second communication port of said server; and wherein said server is adapted to restart said timer mechanism for said time interval responsive to said reset signal.

28. The system for a structure of claim 1 wherein said timer mechanism is further adapted to accept manual input of said time interval from said time input.

* * * * *